(12) United States Patent
Weston et al.

(10) Patent No.: US 10,664,744 B2
(45) Date of Patent: May 26, 2020

(54) END-TO-END MEMORY NETWORKS

(71) Applicant: Facebook, Inc., Menlo Park, CA (US)

(72) Inventors: Jason E. Weston, New York, NY (US); Arthur David Szlam, New York, NY (US); Robert D. Fergus, Tuxedo Park, NY (US); Sainbayar Sukhbaatar, Jersey City, NJ (US)

(73) Assignee: Facebook, Inc., Menlo Park, CA (US)

( * ) Notice: Subject to any disclaimer, the term of this patent is extended or adjusted under 35 U.S.C. 154(b) by 679 days.

(21) Appl. No.: 15/472,086

(22) Filed: Mar. 28, 2017

(65) Prior Publication Data

US 2017/0200077 A1    Jul. 13, 2017

Related U.S. Application Data

(63) Continuation-in-part of application No. 14/881,352, filed on Oct. 13, 2015, now Pat. No. 10,489,701.

(60) Provisional application No. 62/314,947, filed on Mar. 29, 2016.

(51) Int. Cl.
*G06N 3/04* (2006.01)
*G06N 3/08* (2006.01)
*G06F 16/9032* (2019.01)
*G06F 40/279* (2020.01)

(52) U.S. Cl.
CPC ..... *G06N 3/0454* (2013.01); *G06F 16/90332* (2019.01); *G06F 40/279* (2020.01); *G06N 3/0427* (2013.01); *G06N 3/0445* (2013.01); *G06N 3/084* (2013.01)

(58) Field of Classification Search
CPC ............... G06F 40/30; G06F 16/90332; G06F 16/90335–90348; G06N 3/0454; G06N 3/04–3/049
See application file for complete search history.

(56) References Cited

U.S. PATENT DOCUMENTS

2017/0103324 A1    4/2017    Weston et al.

OTHER PUBLICATIONS

Bandanau, Dzmitry et al.; Neural Machine Translation by Jointly Learning to Align and Translate; ICLR 2015; pp. 1-15. (Year: 2015).*

(Continued)

*Primary Examiner* — Stanley K. Hill
(74) *Attorney, Agent, or Firm* — Baker Botts L.L.P.

(57) ABSTRACT

Embodiments are disclosed for predicting a response (e.g., an answer responding to a question) using an end-to-end memory network model. A computing device according to some embodiments includes embedding matrices to convert knowledge entries and an inquiry into feature vectors including the input vector and memory vectors. The device further execute a hop operation to generate a probability vector based on an input vector and a first set of memory vectors using a continuous weighting function (e.g., softmax), and to generate an output vector as weighted combination of a second set of memory vectors using the elements of the probability vector as weights. The device can repeat the hop operation for multiple times, where the input vector for a hop operation depends on input and output vectors of previous hop operation(s). The device generates a predicted response based on at least the output of the last hop operation.

15 Claims, 22 Drawing Sheets

(56) References Cited

OTHER PUBLICATIONS

Sukhbaatar, Sainbayar, Jason Weston, and Rob Fergus. "End-to-end memory networks." Advances in neural information processing systems; 2015; pp. 1-9. (Year: 2015).*
U.S. Appl. No. 14/881,352 by Weston, J., et al., filed Oct. 13, 2015.

* cited by examiner

Joe went to the kitchen. Fred went to the kitchen. Joe picked up the milk. Joe travelled to the office. Joe left the milk. Joe went to the bathroom.
Where is the milk now? A: office
Where is Joe? A: bathroom
Where was Joe before the office? A: kitchen

*FIG. 5*

Joe went to the garden then Fred picked up the milk; Joe moved to the bathroom and Fred dropped the milk, and then Dan moved to the living_room.
Where is Dan? A: living room I believe
Where is Joe? A: the bathroom
Fred moved to the bedroom and Joe went to the kitchen then Joe took the milk there and Dan journeyed to the bedroom; Joe discarded the milk.
Where is the milk now ? A: the milk is in the kitchen
Where is Dan now? A: I think he is in the bedroom
Joe took the milk there, after that Mike travelled to the office, then Joe went to the living_room, next Dan went back to the kitchen and Joe travelled to the office.
Where is Joe now? A: I think Joe is in the office

*FIG. 6*

Bilbo travelled to the cave. Gollum dropped the ring there. Bilbo took the ring. Bilbo went back to the Shire. Bilbo left the ring there. Frodo got the ring. Frodo journeyed to Mount-Doom. Frodo dropped the ring there. Sauron died. Frodo went back to the Shire. Bilbo travelled to the Grey-havens. The End.
Where is the ring? A: Mount-Doom
Where is Bilbo now? A: Grey-havens
Where is Frodo now? A: Shire

*FIG. 7*

Fred went to the kitchen. Fred picked up the milk. Fred travelled to the office.
Where is the milk ? A: office
Where does milk come from ? A: milk come from cow
What is a cow a type of ? A: cow be female of cattle
Where are cattle found ? A: cattle farm become widespread in brazil
What does milk taste like ? A: milk taste like milk
What does milk go well with ? A: milk go with coffee
Where was Fred before the office ? A: kitchen

*FIG. 8*

```
Sam walks into the kitchen.      Brian is a lion.              Mary journeyed to the den.
Sam picks up an apple.           Julius is a lion.             Mary went back to the kitchen.
Sam walks into the bedroom.      Julius is white.              John journeyed to the bedroom.
Sam drops the apple.             Bernhard is green.            Mary discarded the milk.
Q: Where is the apple?           Q: What color is Brian?       Q: Where was the milk before the den?
A. Bedroom                       A. White                      A. Hallway
```

*FIG. 16*

|  | | | | | MemN2N | | | | |
| Task | BoW | PE | PE LS | PE LS RN | 1 hop PE LS joint | 2 hops PE LS joint | 3 hops PE LS joint | PE LS RN joint | PE LS LW joint |
|---|---|---|---|---|---|---|---|---|---|
| 1: 1 supporting fact | 0.6 | 0.1 | 0.2 | 0.0 | 0.8 | 0.0 | 0.1 | 0.0 | 0.1 |
| 2: 2 supporting facts | 17.6 | 21.6 | 12.8 | 8.3 | 62.0 | 15.6 | 14.0 | 11.4 | 18.8 |
| 3: 3 supporting facts | 71.0 | 64.2 | 58.8 | 40.3 | 76.9 | 31.6 | 33.1 | 21.9 | 31.7 |
| 4: 2 argument relations | 32.0 | 3.8 | 11.6 | 2.8 | 22.8 | 2.2 | 5.7 | 13.4 | 17.5 |
| 5: 3 argument relations | 18.3 | 14.1 | 15.7 | 13.1 | 11.0 | 13.4 | 14.8 | 14.4 | 12.9 |
| 6: yes/no questions | 8.7 | 7.9 | 8.7 | 7.6 | 7.2 | 2.3 | 3.3 | 2.8 | 2.0 |
| 7: counting | 23.5 | 21.6 | 20.3 | 17.3 | 15.9 | 25.4 | 17.9 | 18.3 | 10.1 |
| 8: lists/sets | 11.4 | 12.6 | 12.7 | 10.0 | 13.2 | 11.7 | 10.1 | 9.3 | 6.1 |
| 9: simple negation | 21.1 | 23.3 | 17.0 | 13.2 | 5.1 | 2.0 | 3.1 | 1.9 | 1.5 |
| 10: indefinite knowledge | 22.8 | 17.4 | 18.6 | 15.1 | 10.6 | 5.0 | 6.6 | 6.5 | 2.6 |
| 11: basic coreference | 4.1 | 4.3 | 0.0 | 0.9 | 8.4 | 1.2 | 0.9 | 0.3 | 3.3 |
| 12: conjunction | 0.3 | 0.3 | 0.1 | 0.2 | 0.4 | 0.0 | 0.3 | 0.1 | 0.0 |
| 13: compound coreference | 10.5 | 9.9 | 0.3 | 0.4 | 6.3 | 0.2 | 1.4 | 0.2 | 0.5 |
| 14: time reasoning | 1.3 | 1.8 | 2.0 | 1.7 | 36.9 | 8.1 | 8.2 | 6.9 | 2.0 |
| 15: basic deduction | 24.3 | 0.0 | 0.0 | 0.0 | 46.4 | 0.5 | 0.0 | 0.0 | 1.8 |
| 16: basic induction | 52.0 | 52.1 | 1.6 | 1.3 | 47.4 | 51.3 | 3.5 | 2.7 | 51.0 |
| 17: positional reasoning | 45.4 | 50.1 | 49.0 | 51.0 | 44.4 | 41.2 | 44.5 | 40.4 | 42.6 |
| 18: size reasoning | 48.1 | 13.6 | 10.1 | 11.1 | 9.6 | 10.3 | 9.2 | 9.4 | 9.2 |
| 19: path finding | 89.7 | 87.4 | 85.6 | 82.8 | 90.7 | 89.9 | 90.2 | 88.0 | 90.6 |
| 20: agent's motivation | 0.1 | 0.0 | 0.0 | 0.0 | 0.0 | 0.1 | 0.0 | 0.0 | 0.2 |
| Mean error (%) | 25.1 | 20.3 | 16.3 | 13.9 | 25.8 | 15.6 | 15.3 | 12.4 | 15.2 |
| Failed tasks (err. > 5%) | 15 | 13 | 12 | 11 | 17 | 11 | 11 | 11 | 10 |
| On 10k training data | | | | | | | | | |
| Mean error (%) | 15.4 | 9.4 | 7.2 | 6.6 | 24.5 | 10.9 | 7.9 | 7.5 | 11.0 |
| Failed tasks (err. > 5%) | 9 | 6 | 4 | 4 | 16 | 7 | 6 | 6 | 6 |

*FIG. 17*

| Story (1: 1 supporting fact) | Support | Hop 1 | Hop 2 | Hop 3 |
|---|---|---|---|---|
| Daniel went to the bathroom. | | 0.00 | 0.00 | 0.03 |
| Mary travelled to the hallway. | | 0.00 | 0.00 | 0.00 |
| John went to the bedroom. | | 0.37 | 0.02 | | 
| John travelled to the bathroom. | yes | 0.60 | | |
| Mary went to the office. | | 0.01 | 0.00 | 0.00 |

Where is John? Answer: bathroom Prediction: bathroom

| Story (16: basic induction) | Support | Hop 1 | Hop 2 | Hop 3 |
|---|---|---|---|---|
| Brian is a frog. | yes | 0.00 | | 0.00 |
| Lily is gray. | | 0.07 | 0.00 | 0.00 |
| Brian is yellow. | yes | 0.07 | 0.00 | 0.00 |
| Julius is green. | | 0.06 | 0.00 | 0.00 |
| Greg is a frog. | yes | | 0.02 | 0.00 |

What color is Greg? Answer: yellow Prediction: yellow

| Story (2: 2 supporting facts) | Support | Hop 1 | Hop 2 | Hop 3 |
|---|---|---|---|---|
| John dropped the milk. | | 0.06 | 0.00 | 0.00 |
| John took the milk there. | yes | | | 0.00 |
| Sandra went back to the bathroom. | | 0.00 | 0.00 | 0.00 |
| John moved to the hallway. | yes | 0.00 | 0.00 | |
| Mary went back to the bedroom. | | 0.00 | 0.00 | 0.00 |

Where is the milk? Answer: hallway Prediction: hallway

| Story (18: size reasoning) | Support | Hop 1 | Hop 2 | Hop 3 |
|---|---|---|---|---|
| The suitcase is bigger than the chest. | yes | 0.00 | | 0.00 |
| The box is bigger than the chocolate. | | 0.04 | 0.05 | 0.10 |
| The chest is bigger than the chocolate. | yes | 0.17 | 0.07 | |
| The chest fits inside the container. | | 0.00 | 0.00 | 0.00 |
| The chest fits inside the box. | | 0.00 | 0.00 | 0.00 |

Does the suitcase fit in the chocolate? Answer: no Prediction: no

*FIG. 18*

| Model | # of hidden | Penn Treebank | | | | Text8 | | | |
|---|---|---|---|---|---|---|---|---|---|
| | | # of hops | memory size | Valid. perp. | Test perp. | # of hidden | # of hops | memory size | Valid. perp. | Test perp. |
| MemN2N | 150 | 2 | 100 | 128 | 121 | 500 | 2 | 100 | 152 | 187 |
| | 150 | 3 | 100 | 129 | 122 | 500 | 3 | 100 | 142 | 178 |
| | 150 | 4 | 100 | 127 | 120 | 500 | 4 | 100 | 129 | 162 |
| | 150 | 5 | 100 | 127 | 118 | 500 | 5 | 100 | 123 | 154 |
| | 150 | 6 | 100 | 122 | 115 | 500 | 6 | 100 | 124 | 155 |
| | 150 | 7 | 100 | 120 | 114 | 500 | 7 | 100 | 118 | 147 |
| | 150 | 6 | 25 | 125 | 118 | 500 | 6 | 25 | 131 | 163 |
| | 150 | 6 | 50 | 121 | 114 | 500 | 6 | 50 | 132 | 166 |
| | 150 | 6 | 75 | 122 | 114 | 500 | 6 | 75 | 126 | 158 |
| | 150 | 6 | 100 | 122 | 115 | 500 | 6 | 100 | 124 | 155 |
| | 150 | 6 | 125 | 120 | 112 | 500 | 6 | 125 | 125 | 157 |
| | 150 | 6 | 150 | 121 | 114 | 500 | 6 | 150 | 123 | 154 |
| | 150 | 7 | 200 | 118 | 111 | - | - | - | - | - |

*FIG. 20*

END-TO-END MEMORY NETWORKS

CROSS-REFERENCE TO RELATED APPLICATION

This application claims the benefit of U.S. Provisional Patent Application No. 62/314,947, entitled "END-TO-END MEMORY NETWORKS," which was filed on Mar. 29, 2016; this application is a continuation-in-part of U.S. patent application Ser. No. 14/881,352, entitled "GENERATING RESPONSES USING MEMORY NETWORKS," which was filed on Oct. 13, 2015; both of which are incorporated by references herein in their entirety.

BACKGROUND

Automatic question answering (QA) is a form of information retrieval in which focused answers are generated for either user queries, e.g., a key word search, or ad hoc questions, e.g., questions in a natural language format. A question answering system can attempt to handle various question types including: fact, list, definition, how, why, hypothetical, semantically constrained, and cross-lingual questions. The questions can be either in a closed domain or open domain. Closed-domain questions are under a specific knowledge domain (e.g., medicine or physics). Open-domain questions can relate to any topics and usually rely on general knowledge for answers. Question answering is regarded as requiring more complex natural language processing (NLP) techniques than other types of information retrieval such as document retrieval.

Language modeling is another form of information retrieval. Language modeling refers to a task to identify the next word of a text sequence of words, given identities of existing words of the sequence. Language modeling help estimating the relative likelihood of different phrases based on the prediction of the next word. Language modeling tasks are useful in various natural language processing applications, such as speech recognition, speech tagging, parsing, machine translation, handwriting recognition, etc.

BRIEF DESCRIPTION OF THE DRAWINGS

FIG. 5 is an illustration of an example task performed by the memory network.

FIGS. 6-8 are illustrations of various example tasks performed by the memory network.

FIG. 16 is an illustration of example tasks of question answering performed by the end-to-end memory network.

FIG. 17 shows a table listing test error rates of end-to-end memory networks using various numbers of layers and various sentence representations.

FIG. 18 shows a table of sample probabilities p of each hop of end-to-end memory networks.

FIG. 20 shows a table listing language modeling results of end-to-end memory networks trained by two different publically available training sets.

DETAILED DESCRIPTION

The disclosed embodiments relate to an artificial neural network technology called end-to-end memory network, which requires less supervision during training. The model converts a set of input sentences and a question into memory vectors and a question vector. Using a continuous weighting function such as soft maximum function, probability vectors are calculated to indicate the relevance between the question vector and each memory vector. The output for each model layer can be a weighted sum of inputs transformed by an embedding matrix, with elements of the probability vectors as weights. In various embodiments, an embedding function can be employed in place of an embedding matrix. The embedding function can perform any manner of mapping inputs to outputs. As an example, the embedding function can receive the inputs and weights (or some other associated inputs) and generate a nonlinear mapping to outputs. The model can have multiple layers (also referred to as hops). The input to the next layer is a combination of the output and the input of the current layer. The model only needs to be trained using the input-output pair (hence the name end-to-end) and does not require additional supervision for guidance of identifying supporting subset of relevant sentences. The end-to-end memory network technology can be applied to solve problems based on a set of inputs, e.g., question answering and language modeling.

Memory Network

Figure 1:
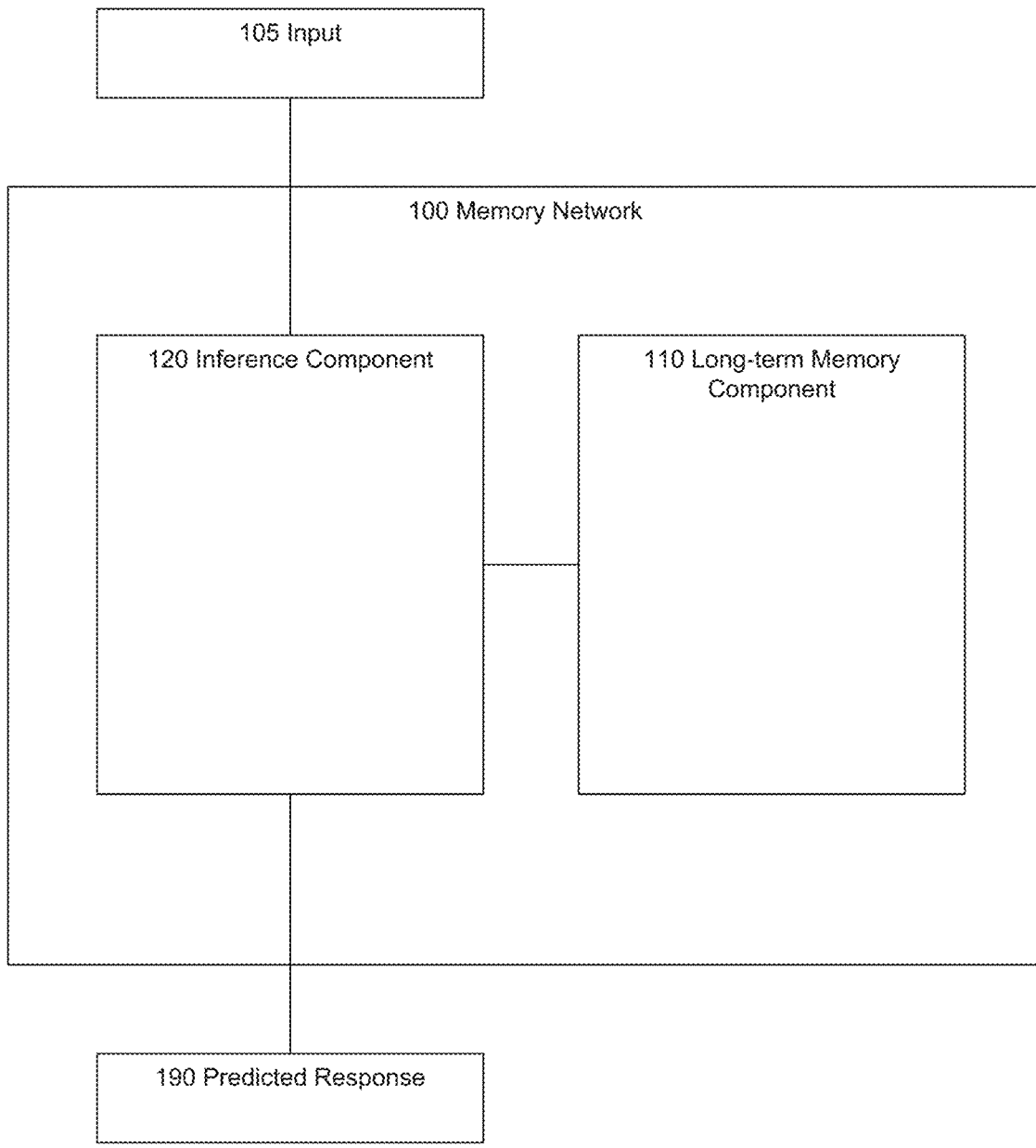
FIG. 1 is a block diagram illustrating a memory network for providing machine-generated responses.

Turning now to the figures, the embodiments illustrated in FIGS. 1-11 disclose a memory network to analyze long-term knowledge base and to generate a textual response as a response to an input. FIG. 1 is a block diagram illustrating a memory network for providing machine-generated responses (e.g., answers), consistent with various embodiments. A memory network 100 is an artificial neural network integrated with a long-term memory component. The memory network 100 conducts logic reasoning using its inference component 120 combined with the long-term memory component 110 (also referred to as "memory component"). Over a training process, the memory network 100 learns how to effectively operate the inference component 120 and the memory component 110 jointly. The memory network 100 can read data from the memory component 110 as well as write data to the memory component 110.

The memory network 100 can provide a prediction based on inputs, particularly to provide a predicted response 190 (also referred to as a "machine-generated response") to an input 105 (e.g., question or inquiry). The long-term memory component 110 acts as a knowledge base for the memory network 100 to make a predicted response (e.g., answer). The knowledge base is dynamic, meaning that the memory network 100 continues to update the long-term memory component 110 using additional inputs, e.g., over time. In some embodiments, the output of the memory network 100 (e.g., the predicted answer) is a textual response. In some embodiments, the output of the memory network 100 can have various forms, such as images, audios, videos, computer-generated actions, user graphic interface elements, etc.

In some embodiments, the memory network 100 has a reasoning capability to chain multiple supporting sources (e.g., text, documents, databases, etc.) together to answer questions that require understanding the intent of verbs in the knowledge contained in the long-term memory component 110.

Figure 2:
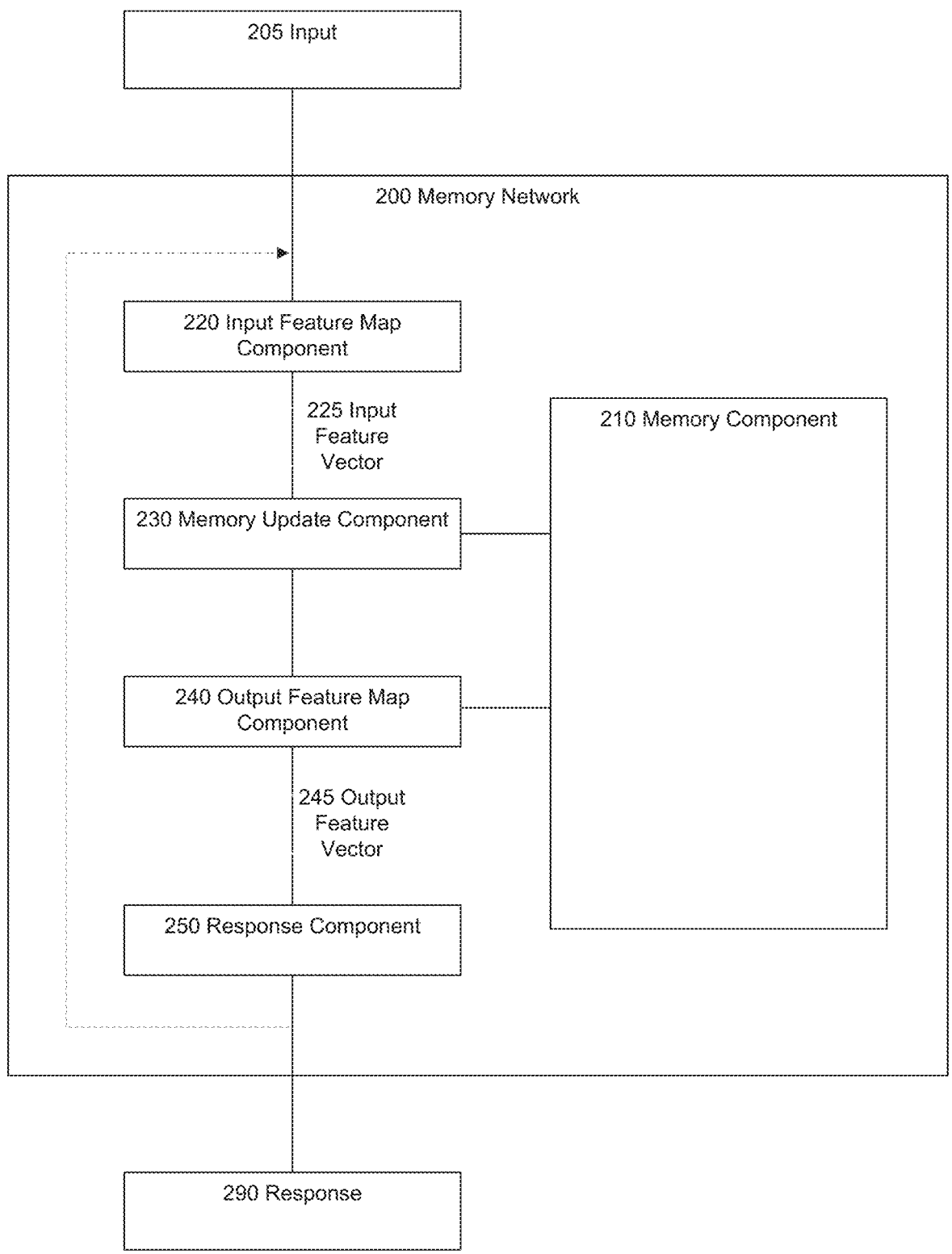
FIG. 2 is a block diagram illustrating data flows between a memory component and various inference components within a memory network.

FIG. 2 is a block diagram illustrating data flows between a memory component and various inference components within a memory network, consistent with various embodiments. The memory network 200 includes a memory component 210 and four inference components: an input feature map component 220, a memory update component 230, an output feature map component 240 and a response component 250. The memory component 210 (noted as m) includes an array of objects (noted as $m_i$, with the index i being the sequence numbers of objects).

The memory network 200 can receive an incoming input 205 (noted as x), e.g., in form of a character, a word, a sentence, an image, an audio, a video, etc. The input feature map component 220 can convert the incoming input 205 into an input feature vector 225 in an internal feature representation space, noted as I(x). The input feature vector 225 can be a sparse or dense feature vector, depending on the choice of the internal feature representation space. For textual inputs, the input feature map component 220 can further perform preprocessing (e.g., parsing, co-reference and entity resolution) on the textual inputs.

Using the input feature vector 225, the memory update component 230 can update the memory component 210 by, e.g., compressing and generalizing the memory component 210 for some intended future use:

$$m_i = G(m_i, I(x), m), \forall i$$

Based on the current state of the memory component 210 and the input feature vector 225, the output feature map component 240 can generate an output feature vector 245 in the internal feature representation space, noted as o:

$$o = O(I(x), m).$$

During the process, the output feature map component 240 receives the input feature vector 225 and scans the memory component 210 to find relevant memory information that relates to the input feature vector 225. The output feature map component 240 then further performs inference to generate the output feature vector 245 based on the relevant memory information.

The response component 250 converts (e.g., decodes) the output feature vector 245 into a response 290 of a desired response format, e.g., a textual response or an action: r=R(o).

In other words, the response component 250 produces the actual wording of the answer. In various embodiments, the response component 250 can include, e.g., a recurrent neural network (RNN) that is conditioned on the output of the output feature map component 240 to produce a sentence as the response 290.

In some embodiments, execution of the components 220, 230, 240, and 250 are optionally iterated in a loop. This is illustrated using the dashed line returning execution after component 250 to component 220. In so doing, the hops can be recomputed based on the component evaluations completed at the end of each iteration.

The data flows as illustrated in FIG. 2 happen in both the training phase and the production phase of the memory network 200. However, there is at least one distinction between the training phase and the production phase. During the training phase, pairs of training inputs and responses are used to train the model parameters of input feature map component 220, memory update component 230, output feature map component 240 and response component 250, noted as I, G, O and R, respectively. In other words, for each desired training input, the desired response is known. The parameters of components I, G, O and R are optimized during the training phase to output the desired responses. In contrast, during the production phase, the parameters of components I, G, O and R are fixed and not updated.

In various embodiments, the memory update component 230 can update the memory component 210 in different ways. For example, the memory update component 230 can add the input feature vector 225 into the memory component 210 as an extra "memory slot" without changing the rest of the memory component 210.

Figure 3:
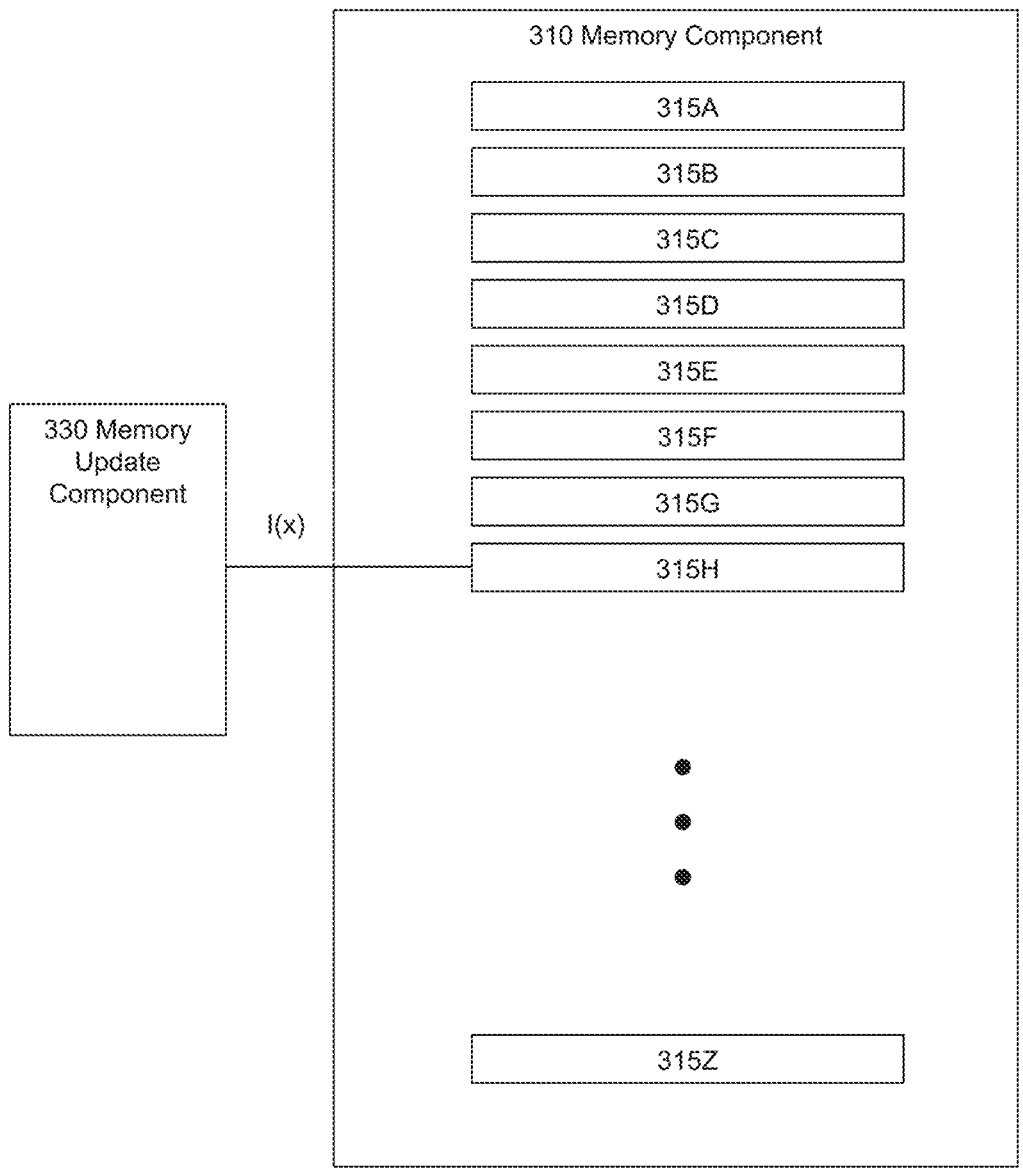
FIG. 3 is a block diagram illustrating a memory component being organized as a combination of memory slots.

FIG. 3 is a block diagram illustrating a memory component being organized as a combination of memory slots, consistent with various embodiments. The memory component 310 (noted as m) includes an array of objects (noted as $m_i$) being organized as a group of memory slots 315A-315Z. The memory update component 330 stores the input feature vector I(x) in a memory slot 315H in the memory component 310:

$$m_{H(x)} = I(x).$$

The H function is a slot-choosing function that selects the memory slot for storing the input feature vector. The memory update component 330 updates the index H of memory component m, wherein the index specifies the total number of memory slots that contain data for the memory component m. Other parts of the memory component 310 (e.g., memory slots 315A-315Z) remain unchanged.

In various embodiments, the memory update component 330 can go back and update some or all of earlier stored memory (e.g., memory slots 315A-315Z) based on new information from the new input x. If the input is at the character or word level, the memory update component 330 can segment the input into chunks and store each chunk in a memory slot.

The slot-choosing function H can further organize the memory slots of the memory component. Particularly for a memory component having a large number of memory slots, the slot-choosing function H can be trained to store memories by entity or topic. Consequently, for efficiency at scale, the memory update component and output feature map component need not operate on all memory slots. These components can operate on only a subset of relevant candidates (e.g., only operating on memory slots that relate to a particular topic).

In various embodiments, the memory component 310 can further erase or replace memory slots (also referred to as "forget"), if the memory component 310 is full. The memory component 310 is full when all allocated memory slots of the memory component 310 have stored actual memory data and no memory slot is available for new memory data. For example, the slot-choosing function H can conduct the "forget" process, by scoring the utility history of each memory slot, and overwriting the memory slot that has been used for the least number of times.

Figure 4:
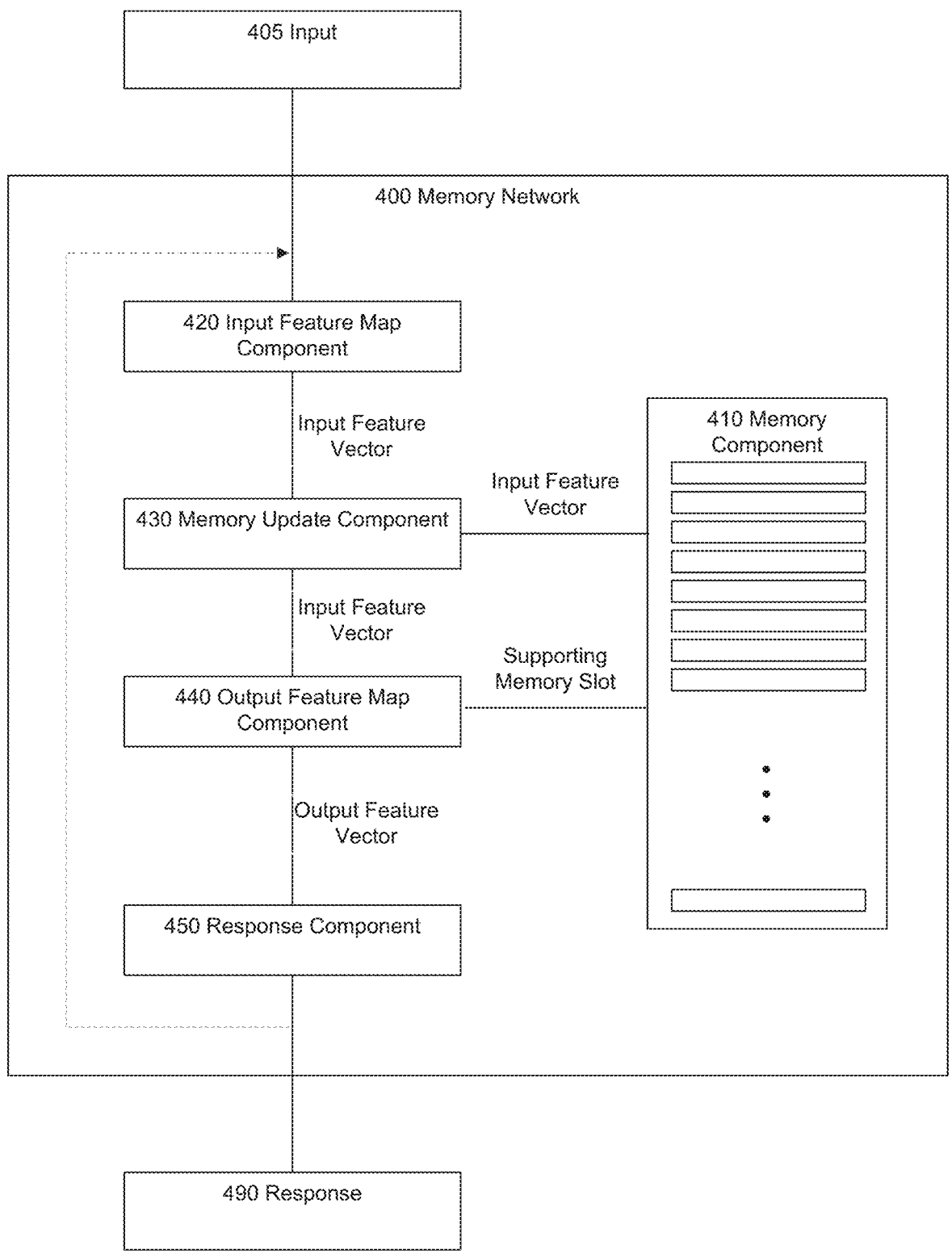
FIG. 4 is a block diagram illustrating a memory network for generating an output as a response to an input.

FIG. 4 is a block diagram illustrating a memory network for generating an output as a response to an input, consistent with various embodiments. The input feature map component 420 of the memory network 400 receives an input 405. The input 405 can be, e.g., a question or inquiry about a fact in a textual form (e.g., a sentence). The input feature map component 420 converts the input 405 into an input feature vector x.

The slot-choosing function returns the next empty memory slot N:

$$m_N = x, N = N+1.$$

The memory update component 430 stores the input feature vector x into the next empty memory slot. In the illustrated embodiment, the memory update component 430 only stores the input feature vector in a new memory slot and does not update any existing memory slots of the memory component 410. However, in various embodiments, the memory update component 430 can update the memory slots in more sophisticated ways.

The output feature map component 440 and the response component 450 are responsible for handling the major part of the inference. The output feature map component 440 produces the output feature vector by first finding multiple (k number of) supporting memory slots that relate to input feature vector x. In the illustrated embodiment, two supporting memory slots are used (thus, k=2). However, in various embodiments, the output feature map component can use any integer number of supporting memory slots, including one.

The output feature map component 440 retrieves a highest scoring supporting memory slot $o_1$:

$$o_1 = O_1(x, m) = \underset{i=1,\ldots,N}{\mathrm{argmax}}\, S_O(x, m_i).$$

Function $S_O$ is a scoring function that scores the relevancy between the pair of the input feature vector x and a memory slot $m_i$. The output feature map component 440 computes the relevancy scores between the input feature vector x and each memory slot using the scoring function $S_O$. Then the memory slot having the highest relevancy score is picked as the first supporting memory slot.

For the second supporting memory slot, the output feature map component 440 calculates the relevancy score with respect to both the original input x and the first supporting memory slot:

$$o_2 = O_2(x, m) = \underset{i=1,\ldots,N}{\mathrm{argmax}}\, S_O([x, m_{O1}], m_i).$$

The square brackets denote a list of the two vectors. A list of vectors can be, e.g., a vector sum. The output feature map component 440 then generates the output feature vector 445 as [x, $m_{O1}$, $m_{O2}$], which is input to the response component 450.

The response component 450 receives output feature vector 445 [x, $m_{O1}$, $m_{O2}$] as input and produces a textual response r (390). In the illustrated embodiment, the response component 450 limits the textual response 490 to be a single word, out of all words known by the memory component 410. However, in various embodiments, the response component 450 can generate a sentence having multiple words based on the same principle. For example, the response component 450 can employ a recurrent neural network (RNN) to generate a response sentence that has multiple words.

The response component 450 calculates relevance scores between the output feature vector 445 and each word in a dictionary of the memory component 410, and picks the word having the highest relevancy score as response 490:

$$r = \mathrm{argmax}_{\omega \in W} S_R([x, m_{O1}, m_{O2}], \omega)$$

wherein W is the set of words in the dictionary and $S_R$ is the relevancy function.

In some embodiments, execution of the components 420, 430, 440, and 550 are optionally iterated in a loop. This is illustrated using the dashed line returning execution after component 450 to component 420. In so doing, the hops can be recomputed based on the component evaluations completed at the end of each iteration.

FIG. 5 is an illustration of an example task performed by the memory network, consistent with various embodiments. In order to answer the question x="Where is the milk now?", the output feature map component 440 first computes relevancy scores between the existing memory slots and the input feature vector that corresponds to the question. In the embodiment illustrated in FIG. 5, each memory slot stores a vector corresponding to a sentence of the existing fact sentences. The existing fact sentences form a "memory," which contains the knowledge that is used to perform the inference. The memory slot with the highest relevancy score is selected as the first supporting memory slot and its corresponding fact sentence is selected as the first supporting relevant fact: "Joe left the milk."

In addition, the output feature map component 440 searches the memory again to find a second supporting relevant fact, by computing relevancy scores between the existing memory slots and a list of the input feature vectors and the first supporting memory slot. By ranking the relevancy scores, the output feature map component 440 finds the second supporting relevant fact: "Joe travelled to the office," which discloses the last place Joe went before dropping the milk.

The dictionary of the memory contains the words of the existing fact sentences illustrated in FIG. 5. The response component 450 calculates relevance scores $r = \mathrm{argmax}_{\omega \in W} S_R$ ([x, $m_{O1}$, $m_{O2}$], ω) between the output feature vector (corresponding to the input sentence and two supporting relevant facts) and each word in a dictionary, and picks the word having the highest relevancy score: r="office."

In the embodiment illustrated in FIGS. 4 and 5, the relevancy scoring functions $S_O$ and $S_R$ can have the same form:

$$s(x,y) = \Phi_x(x)^T U^T U \Phi_y(y).$$

U (referred to as "embedding matrix" or "weight matrix") is a n x D matrix, where D is the number of features and n is an embedding dimension. The embedding dimension can be chosen based on a balance between computational cost and model accuracy. The mapping functions $\phi_x$ and $\phi_y$ map the original input text to an input feature vector in a D-dimensional feature space. The D-dimensional feature space can be, e.g., based on an ensemble of words that appear in the existing memory.

For the relevancy scoring function $S_O$, the memory network can choose the dimension $D=3$ $|W|$. In other words, every word in the dictionary has three different representations: one for mapping function $\phi_x$ and two for mapping function $\phi_y$, depending on whether the words of the input of the function are from the actual input x or from the supporting memories so that they can be modeled differently.

Similarly, for the relevancy scoring function $S_R$, the memory network can also choose the dimension $D=3$ $|W|$. The relevancy scoring functions $S_O$ and $S_R$ can use different weight matrices $U_O$ and $U_R$. In various embodiments, the relevancy scoring functions $S_O$ and $S_R$ can have different forms that are different from the embodiment illustrated here.

In order to determine the parameters of the relevancy scoring functions $S_O$ and $S_R$ (e.g., elements of the weight matrices $U_O$ and $U_R$), the memory network is trained in a supervised setting. The memory network is trained using inputs with known responses. In the training data, the sentences of the supporting relevant facts are also labeled as relevant to the corresponding inputs. In other words, during training the best choice of the relevancy scoring functions is known.

The training is performed with a margin raking loss and stochastic gradient descent (SGD). For a given input question x with a corresponding known response r and supporting sentences $m_{o1}$ and $m_{o2}$ (for the case of k=2), the training process minimizes over model parameters (e.g., elements of the weight matrices $U_O$ and $U_R$):

$$\sum_{\bar{f} \neq m_{O1}} \max(0, \gamma - S_O(x, m_{O1}) + S_O(x, \bar{f})) +$$

$$\sum_{\bar{f}' \neq m_{O2}} \max(0, \gamma - S_O([x, m_{O1}], m_{O2}) + S_O([x, m_{O1}], \bar{f}'))  +$$

$$\sum_{\bar{r} \neq r} \max(0, \gamma - S_R([x, m_{O1}, m_{O2}], r) + S_R([x, m_{O1}, m_{O2}], \bar{r})) +$$

where $\bar{f}$, $\bar{f}'$ and $\bar{r}$ are choices other than the correct labels and $\gamma$ is the margin. At every step of the stochastic gradient descent, the training process samples $\bar{f}$, $\bar{f}'$ and $\bar{r}$ rather than computes the whole sum for each training sample.

In the case that the response component of the memory network employs a recurrent neural network (RNN) to generate the response sentence having multiple words, the last term can be replaced with a log likelihood, and the recurrent neural network is fed with the sequence [x, $o_1$, $o_2$, r]. When the memory network is in production phase, the response component of the memory network outputs the predicted answer based on the output feature vector [x, $O_1$, $O_2$].

Word Sequences as Input

In various embodiments, the memory network can receive input in a form of a stream of words (also referred to as "word sequence") instead of a sentence. Such a stream of words is not segmented or organized as a statement or a question. The memory network can further include a segmentation component for organizing the stream of words into a meaningful statement. The segmentation component takes the word sequence as input and identifies breakpoints of segments within the word sequence. When the segmentation component identifies a segment, the memory update component writes the segment to the memory component.

The segmentation component can be modeled similarly to the output feature map component and response component:

$$\text{seg}(c) = W_{seg}^T U_S \Phi_{seg}(c)$$

where $W_{seg}$ is a vector (effectively including parameters of a linear classifier) and c is the sequence of input words representing a bag of words using a separate dictionary. If $\text{seg}(c) > \gamma$, where $\gamma$ is the margin, the segmentation component recognizes the word sequence as a segment.

In the fully supervised setting, each question in the training set has a corresponding given answer. The input stream can include the question as well as the supporting facts. The segmentation component can be trained using the training set as well, similar to other components. The segmentation component is trained to recognize a meaningful statement within the supporting facts, such as "Bill is in the kitchen" for the question "Where is Bill?" The training criterion for the segmentation component is the minimization of:

$$\sum_{f \in F} \max(0, \gamma - \text{seg}(f)) + \sum_{\bar{f} \in \bar{F}} \max(0, \gamma + \text{seg}(\bar{f}))$$

where F represents the known supporting segments in the labeled training set and $\bar{F}$ (with a top horizontal line) represents other segments in the training set.

Efficient Memory Via Hashing

If the set of stored memories in the memory component is large, it is prohibitively expensive to compute the relevancy scores for all the memory slots when the output feature map component identifies the one or more supporting memory slots. Instead, the memory network can use a hashing component to speed up the lookup of the memory slots. The hashing component hashes the input feature vector I(x) into one or more buckets, then the output feature map component only computes the relevancy scores for memory slots that are in the same buckets.

The hashing can be conducted via hashing words or via clustering word embedding. For hashing words, the memory component can construct as many buckets as there are words in the dictionary. For a given sentence, the memory network hashes the sentence into all buckets corresponding to words of the sentence. As a result, a memory slot will only be considered if the memory slot shares at least one word with the input sentence.

For clustering word embedding, the memory network takes the trained embedding matrix $U_O$ and runs a vector quantization (e.g., K-means clustering) to cluster word vectors $(U_O)_i$, which gives K buckets. A given input sentence is hashed into the buckets that the individual words of the sentence fall into. As word vectors tend to be close to vectors corresponding to the word's synonyms, these vectors cluster together in a bucket and will be used to compute relevancy scores within the same bucket. Exact word matches between input and memory will still be scored by definition. The choice of K depends on the trade-off between the speed and accuracy.

Modeling Write Time Features

The memory network can further take into account a timestamp when a memory slot was written to the memory component. The timestamp can be useful for generating an answer regarding a status based on a story (e.g., the example illustrated in FIG. 5).

In some embodiments, the representations of the mapping functions $\phi_x$ and $\phi_y$ can have extra features to encode the index j of a given memory $m_j$, assuming that j follows write time and that the memory slots are not rewritten. However, this implementation requires dealing with absolute rather than relative time.

In other embodiments, instead of scoring input, the memory network can use the write time features to recognize when each memory was written. Based on the write times, the memory network comprehends the ordering of the actions in the statements that form a story or dialogue.

The write times may be different from the time information that is described in the texts of the statements. Such time information that is described in the texts of statements can include tense of a statement or time expression in a statement. For example, a statement of "he went to the office yesterday" contains time information itself. For statements containing time information, write time features are not necessary, as the time information can be modeled directly from the textual content.

To include the write time features, the relevancy scoring function $S_O$ is updated to include the three write time features:

$$S_{Ot}(x,y,y') = \Phi_x(x)^T U_{Ot}^T U_{Ot}(\Phi_y(y) - \Phi_y(y') + \Phi_t(x,y,y'))$$

$\Phi_t(x, y, y')$ uses three features that take the value of 0 or 1, depending on whether x is older than y, whether x is older than y', and whether y is older than y'. In other words, the model extends the dimensionality of the mapping function $\phi$ by 3 and sets these three dimensions to zero when not used. If $S_O(x, y, y') > 0$ the model prefers y over y', and if $S_O(x, y, y') < 0$ the model prefers y' over y. When selecting supporting memory slots, the arg max function is replaced by a loop over memories: i=1, ..., N. The model keeps the winning memory (y or y') at each step, and compares the current winner to the next memory $m_i$. In other words, at inference time, for a k=2 model, the arg max functions in $$o_1 = O_1(x, m) = \underset{i=1,\ldots,N}{\mathrm{argmax}}\, S_O(x, m_i) \text{ and}$$

$$o_2 = O_2(x, m) = \underset{i=1,\ldots,N}{\mathrm{argmax}}\, S_O([x, m_{O1}], m_i)$$

are placed with $O_t(x,m)$ and $O_t([x, m_{O1}], m)$, where $O_t$ is defined in the following algorithm:

---
Algorithm 1 $O_t$ replacement to arg max when using write time features function $O_t$(q, m)
    t ← 1
    for i = 2, ..., N do
        if $S_{Ot}(q,m_i,m_t) > 0$ then
            t ← i
        end if
    end for
    return
end function

---

The second supporting memory $o_2 = O_t([x, m_{O1}], m)$ captures the relative age of the first supporting memory with respect to the second supporting memory, based on the determinations on whether $m_{o1}$ is older than y', and whether y is older than y'. To train the model with time features, the training process minimizes the following terms over model parameters (e.g., elements of the weight matrices $U_O$ and $U_R$):

$$\sum_{\bar{f} \neq m_{o1}} \max(0, \gamma - S_{Ot}(x, m_{O1}, f)) + \sum_{\bar{f} \neq m_{o1}} \max(0, \gamma - S_{Ot}(x, \bar{f}, m_{O1})) +$$

$$\sum_{\bar{f}' \neq m_{o2}} \max(0, \gamma - S_{Ot}([x, m_{O1}], m_{O2}, \bar{f}')) +$$

$$\sum_{\bar{f}' \neq m_{o2}} \max(0, \gamma - S_{Ot}([x, m_{O1}], \bar{f}', m_{O2})) +$$

$$\sum_{\bar{r} \neq r} \max(0, \gamma - S_R([x, m_{O1}m_{O2}], r) + S_R([x, m_{O1}m_{O2}], \bar{r}))$$

where the first four terms include consideration of the time feature triples directly. At every step of stochastic gradient descent (SGD), the system samples $\bar{f}$, $\bar{f}'$, $\bar{r}$ rather than computes the whole sum for each training example.

Modeling Previously Unseen Words

New words that have never appeared in previous literatures (referred to as "unseen words") are continuously introduced. For example, the word "Boromir" first appears in Lord of The Rings by Tolkien in 1954. The memory network can handle the unseen word by predicting a word based on the neighboring words, and assuming that the unseen word has a similar meaning to the predicted word. Such an approach can be incorporated into the relevancy scoring functions $S_O$ and $S_R$.

For each particular word that the memory network encounters, the memory network can store a set of words that have occurred with the particular word as left context of the particular word, and another set of words that have occurred with the particular word as right context of the particular word. An unseen word can be represented with such features. Hence, the feature representation D can be increased from 3|W| to 5|W| to model these contexts (|W| features for each set of words). When the memory network encounters a word that it has never encountered before and does not have an n-dimensional embedding for that word, the memory network represents the word with the context instead.

Exact Matches and Unseen Words

In various embodiments, the embedding models may not efficiently use extracted word matches due to the relatively low dimensionality n. As a solution to it, the memory network adds the "bag of words" matching score to the learned embedding score (with a mixing parameter λ). The memory network scores a pair x, y with:

$$\Phi_x(x)^T U^T U \Phi_y(y) + \lambda \Phi_x(x)^T \Phi_y(y).$$

Alternatively, the memory network can stay in the n-dimensional embedding space, and extend the feature representation D with matching features. For example, one matching feature per word. A matching feature indicates if a word occurs in both x and y; that is, the memory network scores with $\Phi_x(x)|U|U\Phi_y(y, x)$ where the mapping function $\phi_y$ is built conditionally on x. If some of the words in y match the words in x, the memory network sets those matching features to 1. Unseen words can be modeled similarly by using matching features on their context words. This then gives a feature space of D=8 |W|.

Memory Network Simulation Example

One test simulation behaves like a classic text adventure game. Tasks within the simulation can include question answering tasks regarding the locations of people and objects. The task can also include other tasks, e.g., asking the learner to perform actions within the simulation ("Please pick up the milk", "please find John and give him the milk") and asking the learner to describe actions ("What did John just do?").

The actions in the simulation can include, e.g., go <location>, get <object>, get <object 1> from <object 2>, put <object 1> in/on <object 2>, give <object> to <actor>, drop <object>, look, inventory, examine <object>, etc. The simulation can put a set of constraints on those actions. For example, an actor cannot get something that the actor or someone else already has; an actor cannot go to a place where the actor already is; an actor cannot drop something the actor does not already have, etc.

Based on the underlying actions and constraints, a model defines how actors act. In the model, actors try to perform a random valid action (e.g., go, get, or drop). The actions of the actors form a story that is executable by the simulation. One example of a story is illustrated in FIG. 5. The test then asks questions about the state of the simulation, e.g., "Where is milk?", "Where is Joe?", "Where is Joe before he goes to the office?" The memory network generates the answers to these questions based on the knowledge of the underlying story.

The simulation can use automated grammar to produce natural-looking text with lexical variety. Each verb is assigned a set of synonyms. For example, a verb "get" in the simulation can be replaced with either "pick up", "grab", or "take." A verb "drop" in the simulation can be replaced with either "leave", "discard", or "put down." Similarly, each actor or object can have a set of replacement synonyms as well. For the word sequence training setting, the system can join statements into compound sentences. For example, the system can take a set of statements and join them with one of the following connectors: ".", "and", ", then", ";", ", later", ", after that", ", and then", or ", next".

In one test example, the background story (e.g., the memory) includes 4 characters, 3 objects and 5 rooms. The characters are moving around the rooms, picking up and dropping objects. The actions of the characters are transcribed into text using an automated grammar. Labeled questions are generated. In this example, multiple statements need to be used to conduct inference when asking where an object is. Similar to the example in FIG. 5, the memory network needs to understand the meaning of the actions "picked up" and "left" and the influence of the actions' relative order.

FIGS. 6-8 are illustrations of various example tasks performed by the memory network, consistent with various embodiments. In at least one example, the memory network performed on a data set including 14 million statements. The statements are organized as (subject, relation, object) triples and stored in memory slots of the memory component. Examples of the triples are (milne, authored, winnie-the-pooh) and (sheep, be-afraid-of, wolf), etc. The memory network has been trained using pseudo-labeled question-and-answer pairs including a question and an associated triple, and 35 million pairs of paraphrased questions from a website (e.g. WikiAnswers) like "Who wrote the Winnie the Pooh books?" or "Who is pooh's creator?" The machine-generated answers are annotated as right or wrong by humans.

Figure 9:
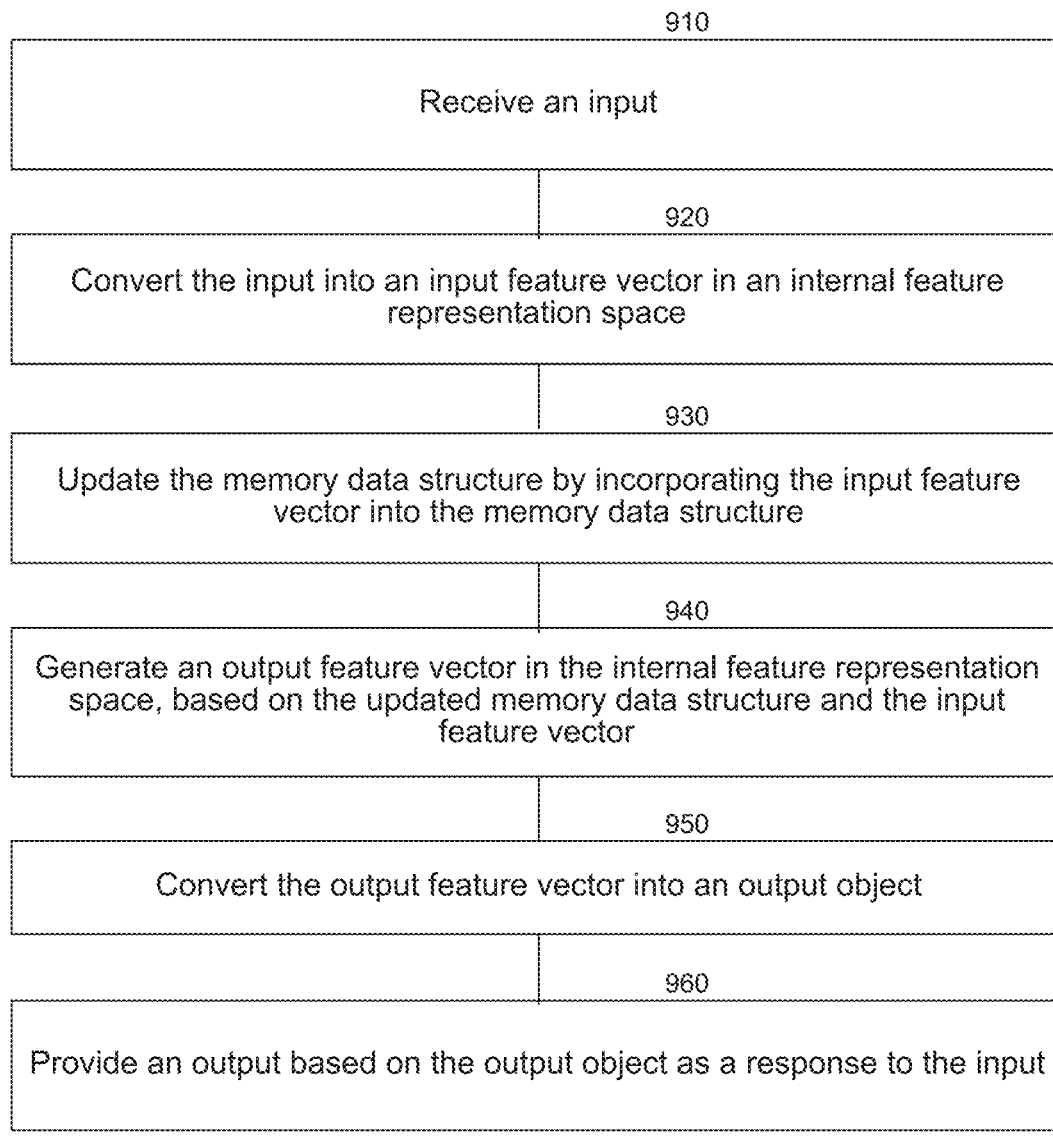
FIG. 9 is a block diagram illustrating a process of providing a machine-generated response to an input using a memory network.

FIG. 9 is a block diagram illustrating a process of providing a machine-generated response to an input using a memory network, consistent with various embodiments. The input or the response can include, e.g., a character, a word, a text, a sentence, an image, an audio, a video, a user interface instruction, a computer-generated action, etc. In various embodiments, the input and the response can be in a form of a question and an answer. The memory network can run, e.g., on a computing device such as a computer, a server or a mobile device. The memory network includes a memory data structure for storing relevant long-term memory information. An example of such long-term memory includes sentences of a background story. If the memory network receives a question that relates to the background story, the memory network can rely on the background story as the long-term memory to generate the answer.

In various embodiments, the memory data structure includes an array of memory objects. The objects can be, e.g., vectors or textual strings. At least some of the objects include information that is relevant to the question. The memory data structure can be organized as multiple memory slots. Each occupied memory slot stores a memory object of the array. The memory data structure can include additional empty memory slots for storing more incoming memory objects.

In order to control the size of the memory data structure, the memory network can use a "forgetting" functionality to optimize the size. The memory network monitors the utility status of the memory slots in the memory data structure. The utility status can indicate, e.g., a number of times that a memory object in a memory slot is selected as a supporting memory object that is relevant to input feature vectors for generating an output feature vector. Based on the utility status of the memory slots, the memory network can select a memory slot with a memory object that is selected the least number of times as a supporting memory object. To save space, the memory network can empty the selected memory slot or overwrite the selected memory slot with an incoming new memory object.

At block 910, the memory network receives an input. The input can include, e.g., a textual message presented as a question. At block 920, the memory network converts the input into an input feature vector in an internal feature representation space. In various embodiments, the memory network may convert the input using a mapping function. The mapping function has a dimension of features D. In other words, the internal feature space has a dimension of D. The internal feature space can be based on, e.g., a predetermined dictionary of words (also referred to as "a bag of words representation"). For example, the internal feature space can be determined as to have three representation features for each word of the predetermined dictionary. The dimension of features D=|W|, where W is the total number of words in the predetermined dictionary.

At block 930, the memory network updates the memory data structure by incorporating the input feature vector into the memory data structure. In various embodiments, the memory network can incorporate the input feature vector in various ways. For example, the memory network can simply store the input feature vector in the next empty memory slot of the memory data structure, without modifying memory slots that store existing memory information. Alternatively, a more sophisticated model can be used to modify the existing memory information in the memory slots based on the input feature vector.

At block 940, the memory network generates an output feature vector in the internal feature representation space, based on the updated memory data structure and the input feature vector. The memory network can generate the output feature vector by, e.g., finding supporting memory entries that are relevant to the input feature vector. For example, the memory network can identify one or more supporting memory entries in the memory data structure as being relevant to the input feature vector. Based on the identified support memory entries as well as the input feature vector, the memory network generates the output feature vector.

In various embodiments, the memory network can use a relevancy function to determine relevancy scores between the input feature vector and memory entries in the memory data structure. The parameters of the relevancy function are trained using a training data set including questions and answers. The memory network identifies the supporting memory entries based on the relevancy scores. In some embodiments, the memory network combines the supporting memory entries by, e.g., generating a vector sum of the supporting memory entries and the input feature vector.

The relevancy function can include a weight matrix (also referred to as an "embedding matrix"). The weight matrix can have a feature dimension determined based on a total number of words in a predetermined dictionary. The other dimension of the weight matrix is the embedding dimension (hence the name "embedding matrix"), which is consistent with the dimensions of the input feature vector and memory entry vectors in the memory slots.

The weight matrix includes matrix elements that are determined by a training process using the training data set that includes pairs of questions and known answers. The elements of the weight matrix can be trained using, e.g., a stochastic gradient descent process. During each step, the stochastic gradient descent process samples memory entries in the memory data structure that are not the supporting memory entries.

In various embodiments, the memory network can take into account modeling write time as well. For example, the indices of the memory objects of the array can follow a sequence consistent with write timestamps of the memory objects. Alternatively, the relevancy function can be a triples relevancy function taking the write time into account. The input of a triples relevancy function is the input feature vector and two memory objects from the memory data structure. The relevancy score of the triples relevancy function determines whether a first memory object is preferable over the second memory object or the second memory object is preferable over the first memory object. The memory network uses the triples relevancy functions to determine scores for the input feature vector and various duos of memory objects. The memory network selects a memory object that is preferable over a remainder of the memory objects of the array as a first supporting memory, based on the relevancy scores of the triples relevancy functions. The memory network can further select more supporting memories based on the scores. The memory network then generates the output feature vector based on the supporting memory or memories and the input feature vector.

At block 950, the memory network converts the output feature vector into an output object (e.g., an output textual message). The output object can include, e.g., a word or a sentence. In various embodiments, the memory network uses a second relevancy function to determine relevancy scores between the output feature vector and words in a predetermined dictionary. The memory network selects a word that has a highest relevancy score from the predetermined dictionary and generates an output textual message including the selected word.

The second relevancy function used at block 950 may have the same form as the relevancy function used at block 940. However, the parameters of the second relevancy function can be different from the previous relevancy function. In other words, the matrix elements of the second relevancy function can be different from the elements of the first relevancy function. Like the first relevancy function, the matrix elements of the second relevancy function can be trained by a training process using pairs of questions and known answers.

In some embodiments, the memory network can use a recurrent neural network to generate a sentence as the output textual message based on the output feature vector.

At block 960, the memory network provides an output based on the output object as a response to the input. For example, the response can be an answer responding to a question. The output can include, e.g., a character, a word, a sentence, a paragraph, a string, an image, an audio, a video, or a user interface instruction.

Figure 10:
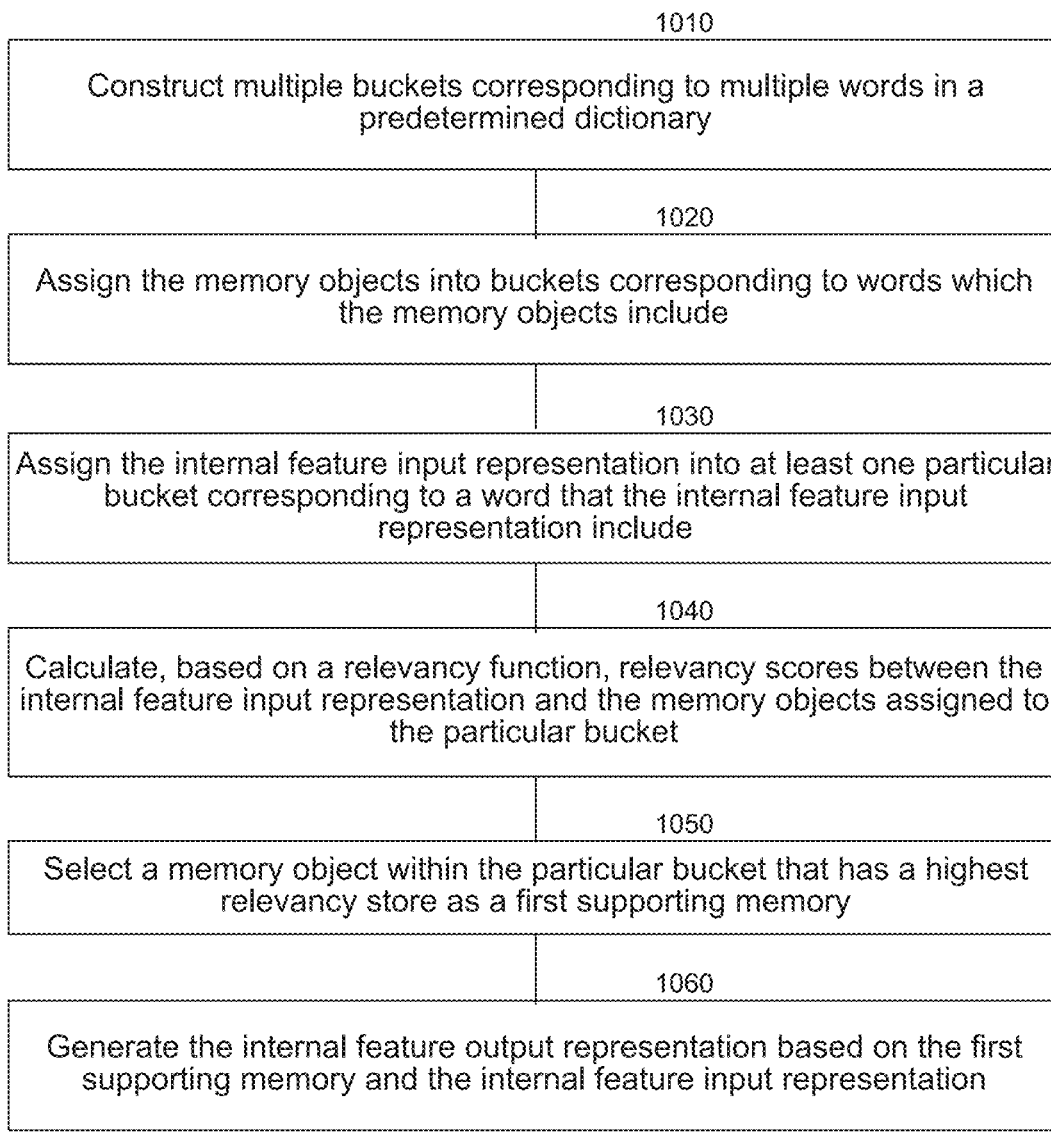
FIG. 10 is a block diagram illustrating a process of hashing memory entries into multiple buckets via word hashing.
Figure 11:
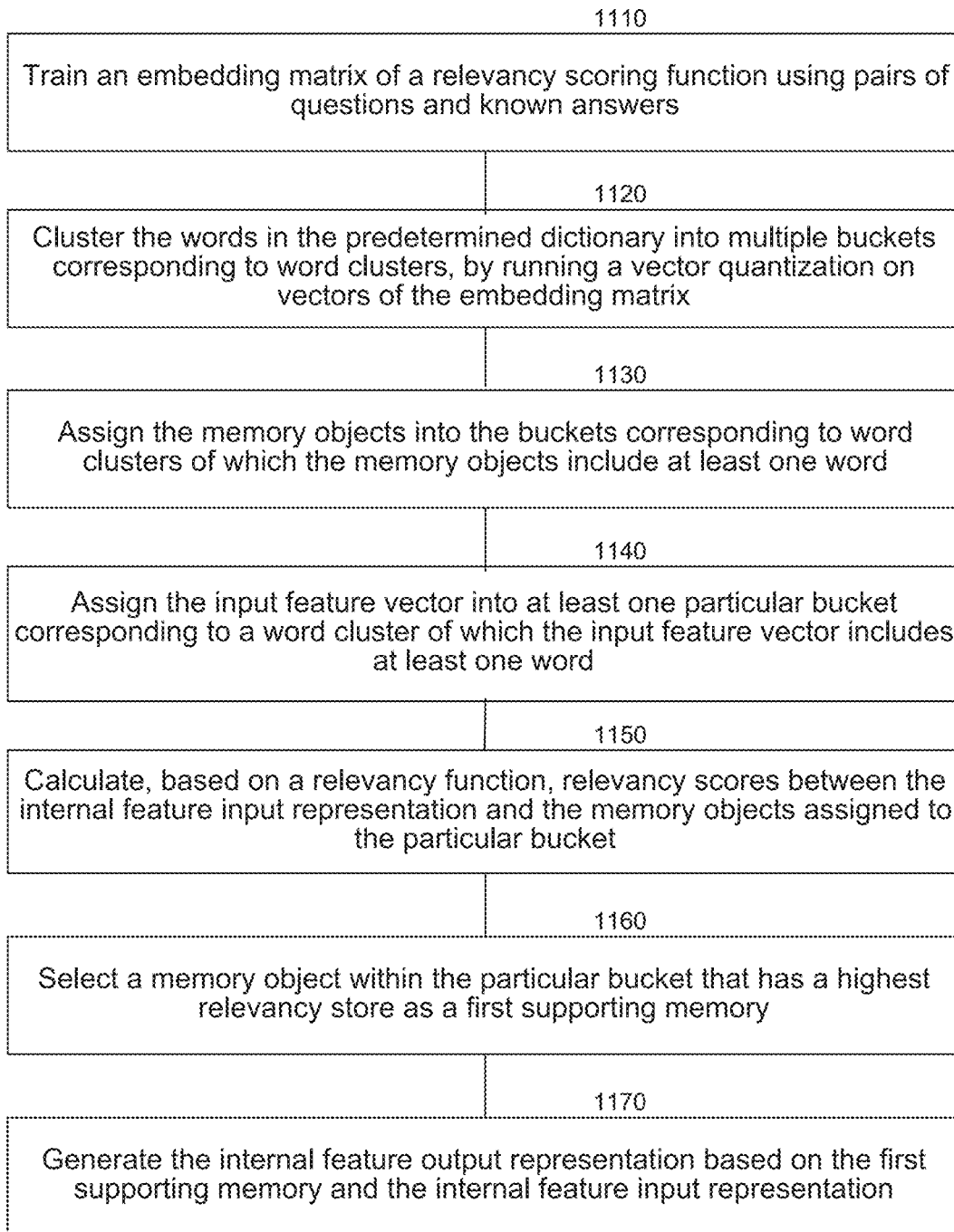
FIG. 11 is a block diagram illustrating another process of hashing memory entries into multiple buckets via clustering word embedding.

If the data size of the memory network is large, it may be prohibitive to calculate the relevancy scores between the input feature vector and all memory entries in the memory data structure at block 940. In order to improve the efficiency, the memory network may use a hashing method to break down the memory entries into multiple buckets and calculate the relevancy scores between the input feature vector and all memory entries in a relevant bucket. FIGS. 10 and 11 illustrate examples of hashing methods for memory entry bucket assignment.

FIG. 10 is a block diagram illustrating a process of hashing memory entries into multiple buckets via word hashing, consistent with various embodiments. At block 1010, the memory network can construct multiple buckets corresponding to multiple words in a predetermined dictionary. A bucket corresponding to a particular word is used to include memory objects relevant to the particular word. At block 1020, the memory network assigns the memory objects into buckets corresponding to words that the memory objects include.

At block 1030, the memory network assigns the internal feature input representation into at least one particular bucket corresponding to a word that the internal feature input representation includes. At block 1040, the memory network calculates, based on a relevancy function, relevancy scores between the internal feature input representation and the memory objects assigned to the particular bucket.

At block 1050, the memory network selects a memory object within the particular bucket that has a highest relevancy score as a first supporting memory. At block 1060, the memory network generates the internal feature output representation based on the first supporting memory and the internal feature input representation.

FIG. 11 is a block diagram illustrating another process of hashing memory entries into multiple buckets via clustering word embedding, consistent with various embodiments. At block 1110, the memory network trains an embedding matrix of a relevancy scoring function using pairs of questions and known answers. The embedding matrix has a dimension corresponding to a number of words in a predetermined dictionary. At block 1120, the memory network clusters the words in the predetermined dictionary into multiple buckets corresponding to word clusters, by running a vector quantization on vectors of the embedding matrix. At block 1130, the memory network assigns the memory objects into the buckets corresponding to word clusters of which the memory objects includes at least one word.

At block 1140, the memory network assigns the input feature vector into at least one particular bucket corresponding to a word cluster of which the input feature vector includes at least one word. At block 1150, the memory network calculates, based on a relevancy function, relevancy scores between the internal feature input representation and the memory objects assigned to the particular bucket.

At block 1160, the memory network selects a memory object within the particular bucket that has a highest relevancy score as a first supporting memory. At block 1170, the memory network generates the internal feature output representation based on the first supporting memory and the internal feature input representation.

End-To-End Memory Network: Overview

The embodiments illustrated in FIGS. 1-11 disclose a memory network to analyze long-term knowledge base and to generate a textual response as a response to an input. Such a memory network determines one or more supporting memory vectors that are most relevant to the input feature vector among the stored memory slots. The relevancy is evaluated using matching functions whose matrix elements are trained by a fully supervised data set including questions and desired responses. In other words, the training of the matrix elements of the matching functions needs supervision during the training stage. During the training of the memory network, supervision is provided as to pick which supporting memory vectors are most relevant to the input.

In contrast, the embodiments illustrated in the following FIGS. 12-21 disclose an end-to-end memory network, which does not require supervision of the matching functions during the training stage. In other words, the end-to-end memory network only needs to be trained using the input-output pair (hence the term "end-to-end") and does not require additional supervision for guidance of identifying any relevant supporting subset.

The end-to-end memory network is a neural network with a recurrent attention model that can handle a large external memory. The recurrent neural network architecture of the model reads from a large external memory multiple times before outputting an answer (e.g., a symbol). The network as a whole is trained via back-propagation, and requires no supervision at east layer (also referred to as hop) of the network.

Since the network is trained end-to-end and requires significantly less supervision during training, the network is flexible and can be applied to a wide range of applications in realistic settings. The possible applications include, e.g., question answering and language modeling. The multiple hops over the long-term memory lead to good performance on the tasks. The training of the memory representation can be integrated in a scalable manner for the end-to-end memory network model.

Each Layer of End-To-End Memory Network

The end-to-end memory network model (also referred to as "the model") takes a discrete set of inputs $x_1, \ldots, x_n$ (input set $\{x_i\}$, i=1 to n, which are to be stored in the memory) and a query q as inputs, and outputs an answer a. Each of the $x_i$, q, and a contains symbols (e.g., words) coming from a dictionary with V words. The dictionary refers to a data structure includes symbols or words from the set of inputs and the query. The model writes all x to the memory up to a buffer size, and then finds a continuous representation for the inputs x and the query q. In each layer, the end-to-end memory network model conducts a single memory hop operation.

The continuous representation is then processed via one or more layers (hops) of memory networks to output a. In other words, the layers are stacked to perform multiple hops in memory. This architecture allows back-propagation of the training error signal through multiple memory layers back to the input during training.

Figure 12:
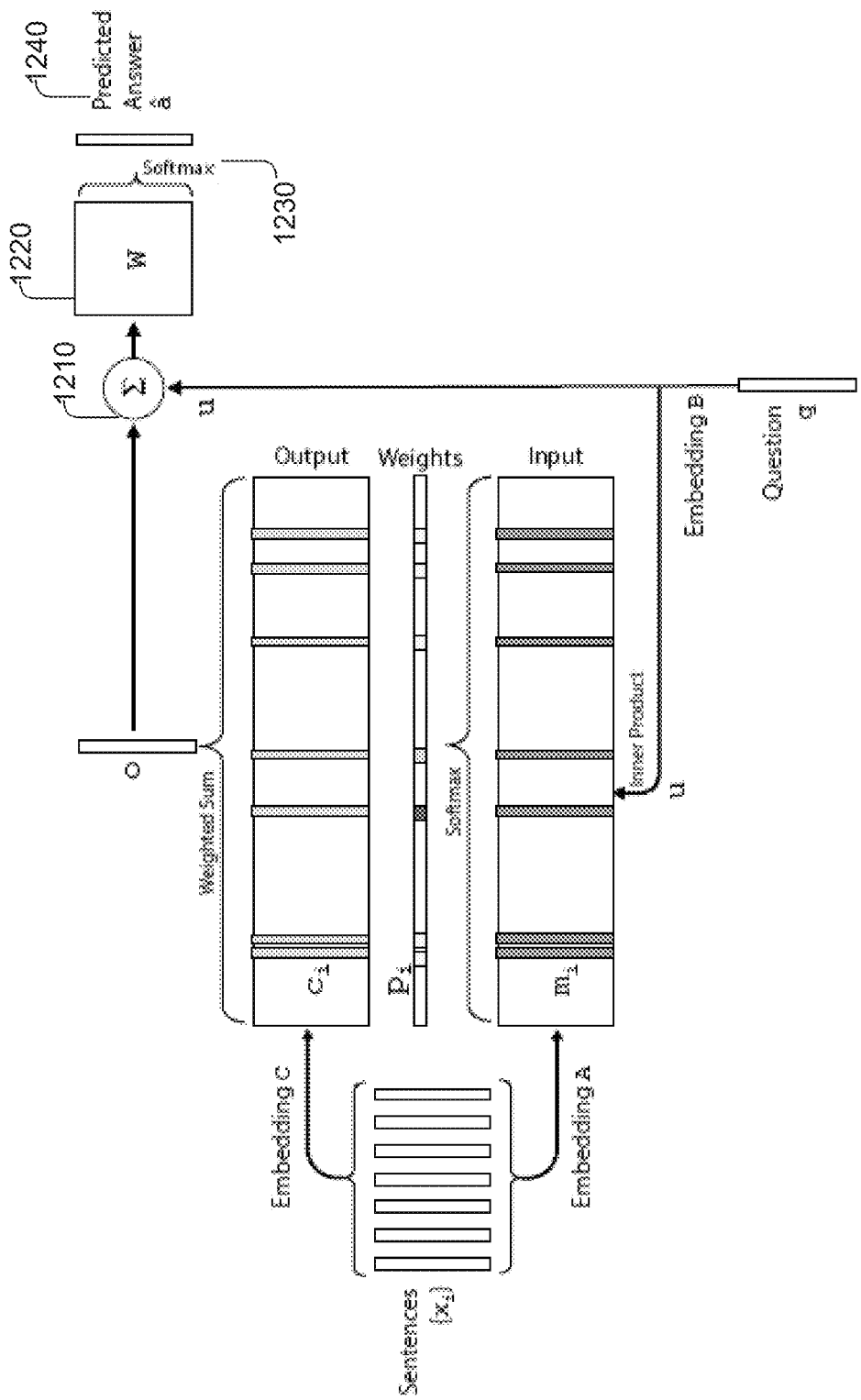
FIG. 12 is a block diagram illustrating a sample layer of an end-to-end memory network.

FIG. 12 is a block diagram illustrating a sample layer of an end-to-end memory network. First, the input set $x_1, \ldots, x_n$ (e.g., sentences) are converted into an input memory representation. The input set of $\{x_i\}$ are converted into memory vectors $\{m_i\}$ of dimension d, computed by embedding each $x_i$ in a continuous space. For example, the model can use an embedding matrix A (of dimension d×V) to convert the input set of $\{x_i\}$ into memory vectors $\{m_i\}$.

The query q can also be embedded and converted into an internal state inquiry vector u. For example, the model can use an embedding matrix B (of dimension d×V) to convert the query q into the internal state inquiry vector u. In some embodiments, the embedding matrix A can be the same matrix as the embedding matrix B. Alternatively, the embedding matrix A can include matrix elements that are different from matrix element of the embedding matrix B.

In some embodiments, the number of sentences and the number of words per sentences vary between tasks. The model can use, e.g., a null symbol to pad all sentences to a predetermined size. For example, the embedding of the null symbol can be constrained to be zero.

In the embedding space, the model computes the match between the internal state inquiry vector u and each memory vector $m_i$, by calculating a probability vector based on the internal state vector u and each memory vector $m_i$. In some embodiments, the probability vector can be an inner product (also referred to as dot product) of the internal state vector u and each memory vector $m_i$, followed by a continuous weighting function (e.g., softmax function):

$$p_i = \text{Softmax}(u^T m_i).$$

The elements $p_i$ of the probability vector p contain information regarding the relevancy between the internal state vector u and each memory vector $m_i$.

The continuous weighting function squashes and normalizes a multi-dimensional vector of arbitrary values to a vector of values in a certain range that add up to a normalization threshold value (e.g., 1). For example, the continuous weighting function can be, e.g., a softmax function (also referred to as soft maximum function or normalized exponential function).

$$\text{Softmax}(z_i) = e^{z_i}/\Sigma_j e^{z_i}$$

Unlike the memory network illustrated in FIGS. 1-4, the end-to-end memory network does not need to use a hard max function to select any relevant supporting memories.

For each input vector $x_i$, the model further converts the inputs into an output vector c with elements $c_i$. For example, the model can use an embedding matrix C (of dimension d×V) to convert the input set of $\{x_i\}$ into output vector $\{c_i\}$. Then the output vector from the memory o is then a sum over elements of the output vector ci (transformed from inputs $x_i$), weighted by the corresponding elements of probability vector p:

$$o = \sum_i p_i c_i$$

Because the functions from input to output is smooth, the model is easy to compute gradients and the training error signal is easy to back-propagate through the model.

If the model contains only one layer, a combination (e.g., a sum as 1210 in FIG. 12) of the output vector o and the input embedding u is then passed through a final weight matrix W (of size V×d, 1220 in FIG. 12) and then a continuous weighting function (e.g., softmax, 1230 in FIG. 12) to produce the predicted answer (e.g., a predicted label, 1240 in FIG. 12):

$$\hat{a} = \text{Softmax}(W(o+u)).$$

During a training stage, all three embedding matrices A, B and C, as well as the final weight matrix W are jointly trained by minimizing a loss function between the predicted answer â and the true answer a. The loss function can be, e.g., a cross-entropy loss function, a logarithmic loss function, ranking loss function, etc. The training can be performed through a process minimizing the loss function, e.g., a stochastic gradient descent process.

The model illustrated in FIG. 12 can be a single layer model. Furthermore, the end-to-end memory network model can also contain multiple layers and therefore handle multiple hop operations. For a model containing multiple layers, the process of FIG. 12 applies to each layer of the model as well, except that not all layers include final weight matrix 1220, softmax 1230 and produce the answer 1240 as illustrated in FIG. 12.

End-To-End Memory Network with Multiple Layers

Figure 13:
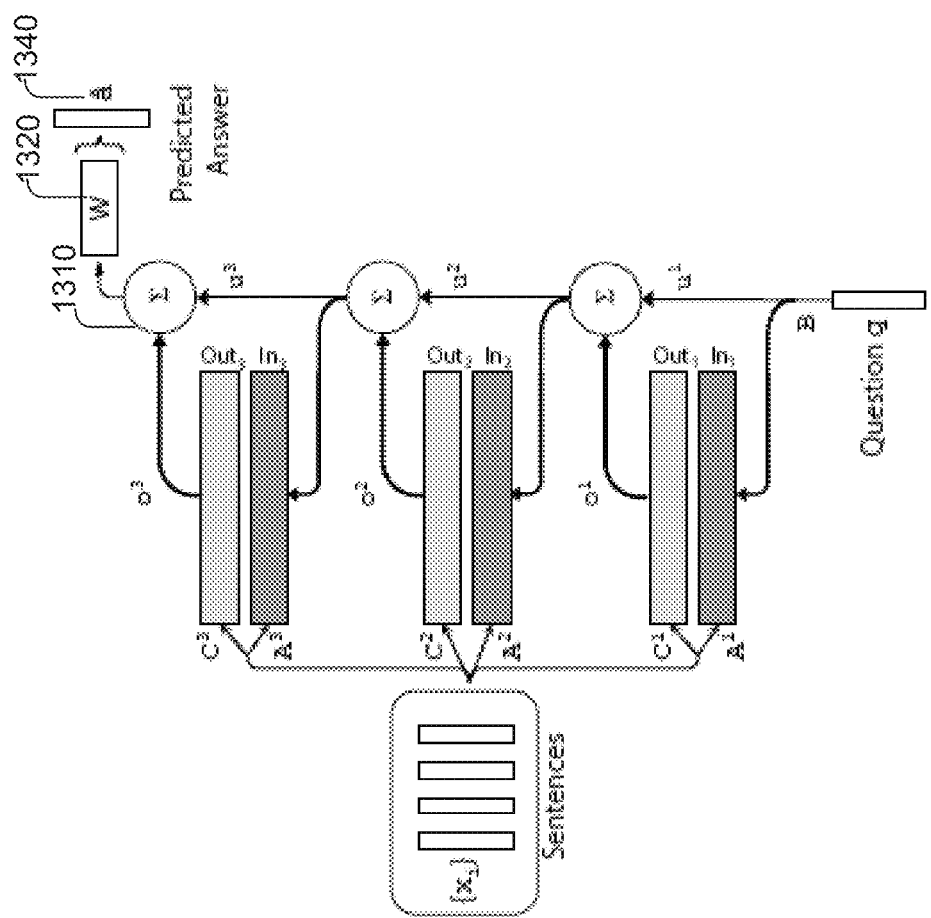
FIG. 13 is a block diagram illustrating an end-to-end memory network including multiple layers of neural networks.

FIG. 13 is a block diagram illustrating an end-to-end memory network including multiple layers of neural networks. As shown in FIG. 13, the memory layers are stacked. Although FIG. 13 shows an end-to-end memory network including three layers (also referred to as hops or hop operations), the technology disclosed herein can be applied to network including any arbitrary number of layers.

On top of a layer k, the input to the next layer k+1 above is a combination of the output $o^k$ and the input $u^k$ from layer k. For example, the input can be a sum of the output $o^k$ and the input $u^k$:

$$u^{k+1} = u^k + o^k.$$

In some embodiments, the model can use a layer-wise tying scheme. Under the layer-wise tying scheme, the input embedding matrices (also referred to as the first memory embedding matrices) for different layers can be constrained to be the same, to ease training a reduce the number of parameters: $A^1 = A^2 = \ldots = A^K$. Similarly, the output embedding matrices (also referred to as the second memory embedding matrices) for different layers can also be constrained to be the same: $C^1 = C^2 = \ldots = C^K$.

In addition, a linear mapping matrix H can be added to update u between hops: $u^{k+1} = H u^k + O^k$. This linear mapping matrix H can be trained along with the rest of matrices within the network and used though the layers for layer-wise weight tying.

In some alternative embodiments, each layer can have its own version of embedding matrices A, B and C that contain parameters that are different from the corresponding embedding matrices of other layers. The model can still apply certain restrains (tying) to the matrices For example, in some embodiments, the model can use an adjacent weight tying scheme. Under the adjacent weight tying scheme, the output embedding matrix for one layer is the input embedding matrix for the next layer above: $A^{k+1} = C^k$. Additional constraints can be applied. For example, the answer prediction matrix W (also referred to as final weight matrix) can be the same as the last output embedding matrix: $W^T = C^K$. The inquiry embedding matrix (also referred to as question embedding matrix) can also match the input embedding matrix of the first layer: $B = A^1$.

Comparing to the layer-wise tying scheme, the adjacent weight tying scheme allows more matrix parameters and therefore is more flexible to handle different situations. However, the adjacent weight tying scheme needs more training data and the training process is usually longer.

At the top of all layers of the network, the input to the answer prediction matrix W (1320 of FIG. 13) is a combination (e.g., a sum as 1310 of FIG. 13) of the input and the output of the last memory layer (also referred to as last hop). The predicted answer 1340 can be calculated as:

$$\hat{a} = \text{Softmax}(Wu^{K+1}) = \text{Softmax}(W(o^K + u^K)).$$

The end-to-end memory network model illustrated in FIG. 13 explicitly conditions on the outputs stored in the memory during the K hops (layers). The model keeps outputs soft and retains the information of all outputs, rather than sampling or picking the outputs. The model makes multiple computational steps before producing an output that is meant to be received by an inquiring party outside of the model.

In some embodiments, the model can be initially trained with the softmax function removed from each layer, making the model entirely linear except for the final softmax function for answer prediction. When the validation loss (also referred to as objective loss function) stops deceasing, the softmax functions for the layers are re-inserted into the layers of the model and the model is further trained with the softmax functions. Such a training process is referred to as linear start (LS) training.

Input and Output Sentence Representation

The end-to-end memory network can use various types of representations for the input sentences including, e.g., bag-of-words representation, position encoding representation, temporal encoding representation, etc.

For a bag-of-words representation, the model takes an input sentence $x_i$, which includes one or more words $\{x_{i1}, x_{i2}, \ldots, x_{in}\}$, embeds each word and sums the resulting vectors: e.g., $$m_i = \Sigma_j A x_{ij}, c_i = \Sigma_j C x_{ij},$$

where the input vector u presenting the question is also embedded as a bag of words:

$$u = \Sigma_j B q_j;$$

where each $q_j$ represents a word of the question. The bag-of-words presentation does not capture information regarding the order of the words in the input sentences and the question.

For a position encoding representation, the model encodes the position of words within the sentences. For example, the memory vectors can be represented in a form:

$$m_i = \Sigma_j l_j \cdot A x_{ij},$$

where the dot is an element-wise multiplication, $l_j$ is a column vector with the structure of $$l_{kj} = (1 - j/J) - (k/d)(1 - 2j/J),$$

with J being the number of words in the sentences, and d is the dimension of the embedding. With the position encoding representation, the order of the words within the sentences affects the representation and values of memory vectors $m_i$. In other words, the memory vectors $m_i$ contain encoded information that relates to the word position. The position encoding representation can be applied to questions, memory inputs and/or memory outputs.

For a temporal encoding representation, the model can represent the memory vector in a form of:

$$m_i = \Sigma_j A x_{ij} + T_A(i),$$

where $T_A(i)$ is the ith row of a special matrix $T_A$ that encodes temporal information. The output embedding is augmented in the same way with a matrix $T_c$:

$$c_i = \Sigma_j C x_{ij} + T_c(i).$$

Both $T_A$ and $T_C$ can be learned (also referred to as trained) during training of the model. Those matrices can be also subject to the same weight tying constraints as matrices A and C. In some embodiments, the sentences can be indexed in reverse order, reflecting their relative distance from the question so that $x_1$ is the last sentence of the story. The temporal encoding presentation is useful for a question answer task that can be benefited from notion of temporal context. For example, in the first task in FIG. 14 discussed in the following paragraphs, the model needs to understand that Sam is in the bedroom after he was in the kitchen.

In some embodiments, the model can include "dummy" memories to regularize $T_A$. In other words, at training time, additional (e.g., 10%) of empty memories (also referred to as random noise) can be added to the stories to increase the flexibility of the model for a better learning of temporal relationships.

Components of a Sample End-to-End Memory Network (MemN2N) Model

Figure 14:
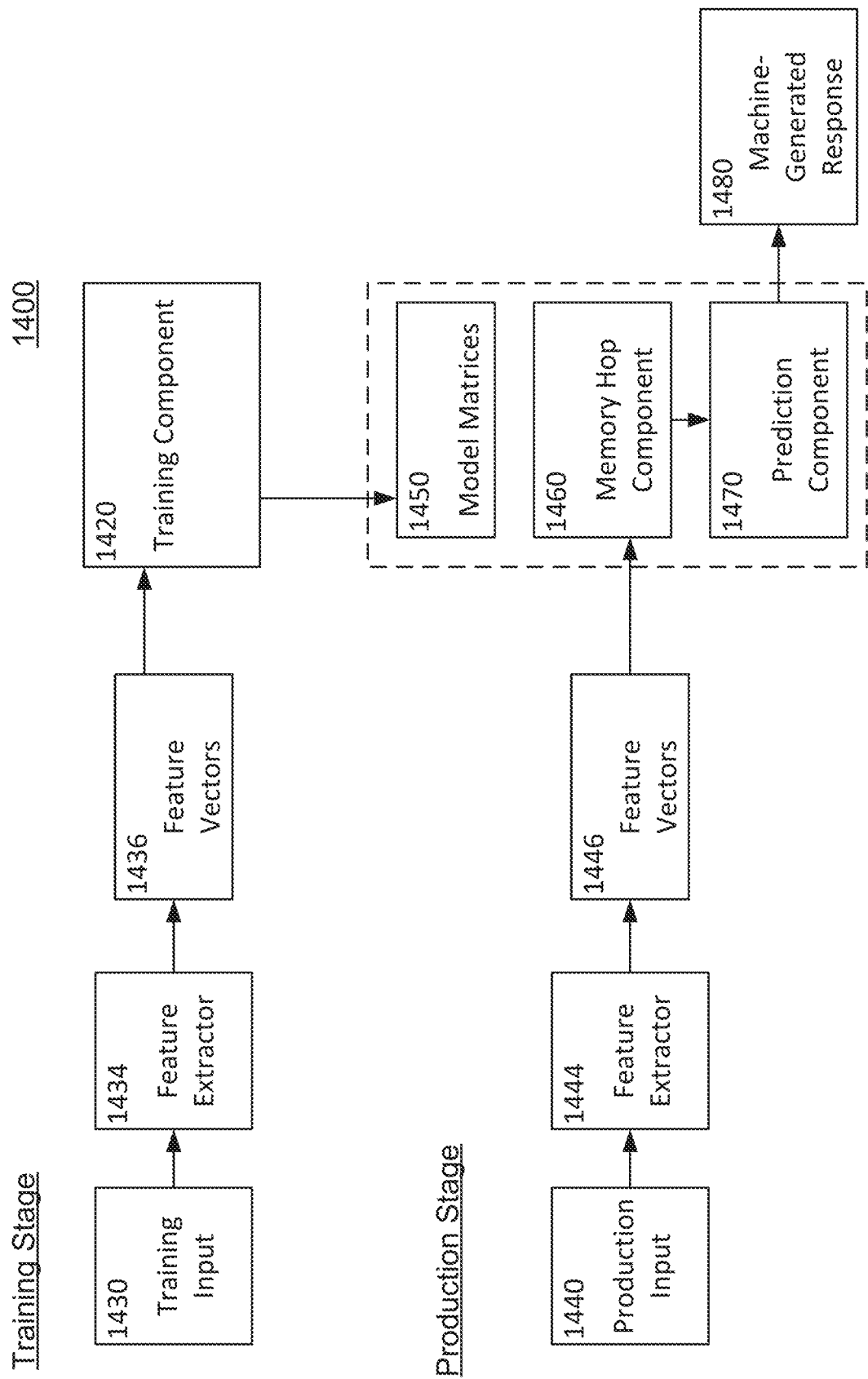
FIG. 14 is a block diagram illustrating components of an end-to-end memory network model.

FIG. 14 is a block diagram illustrating components of an end-to-end memory network model. The end-to-end memory network model (also referred to as "MemN2N model" or simply "model") 1400 can run at two separated stages, i.e., training stage and production stages.

At the training stage, the model 1400 trains itself using the training data from a training set including sample knowledge entries, sample inquiries and sample responses. For example, for question answering application, a sample inquiry can be a sample question, a sample response is a predetermined answer that is meant to be the correct answer to the question, a set of sample knowledge entries can include sentences of a story that relates to the sample question or sample answer. In various embodiments, knowledge entries can include text, images, sounds, or indeed anything that can be represented by one or more data structures.

At the training stage, the model 1400 receives the training input 1430 including, e.g., sample knowledge entries, sample inquiries and sample responses. The model 1400 feeds the training input 1430 to feature extractor 1434 to generate feature vectors 1436. For example, the feature extractor 1434 can include an inquiry embedding matrix to convert the sample inquiry into an input vector, and a first and second memory embedding matrices to convert the knowledge entries into a first set and a second set of memory vectors.

The training component 1420 uses the feature vectors (e.g., the input vector and the memory vectors) to generate a predicted response. The training component 1420 trains parameters of matrices 1450 of the model 1400 (including, e.g., the inquiry matrix and memory embedding matrices) by minimizing differences between the provided sample responses and the predicted responses. For example, in some embodiments, the training component 1420 can train the matrices 1450 by minimizing, e.g., a standard cross-entropy loss between sample responses and the predicted responses, through a stochastic gradient descent process. The model 1400 can include various types of matrices 1450 to be trained, including, e.g., the inquiry embedding matrix B, memory embedding matrices A and C, response prediction matrix W. In some embodiments, the training component 1420 needs no supervision on picking knowledge entries or memory vectors that are relevant to the inquiry, during the training of the matrices.

At the production stage, the model 1400 receives inputs including knowledge entries and an inquiry, and generates a predicted response (e.g., an answer to a question). The model 1400 receives production input 1440 including, e.g., an inquiry and knowledge entries. For a question answering application, the set of knowledge entries can be a set of sentences; the inquiry can be a question seeking an answer based on the sentences; and the machine-generated response can be a machine-predicted answer to the question. For a language modeling application, the set of knowledge entries can be words within a text sequence; the inquiry can seek a prediction of a next word for the text sequence, and the machine-generated response can be a machine-prediction of the next word for the text sequence.

The model 1400 feeds the production input 1440 into a feature extractor (also referred to as feature extraction component) 1444 to generate feature vectors 1446. The feature extractor 1444 can be the same as the feature extractor 1434, with trained matrix parameters. For example, just like the feature extractor 1434, the feature extractor 1444 can include the inquiry embedding matrix to convert the inquiry into an input vector, and a first and second memory embedding matrices to convert the knowledge entries into a first set and a second set of memory vectors.

The model 1400 feeds the feature vectors 1446 (e.g., the input vector and the memory vectors) into a memory hop component 1460. The memory hop component can conduct one or more hop operations (also referred to as layers). In some embodiments, during each hop operation, the hop operation determines an input vector for the individual hop operation. For example, in an event that the individual hop operation is a first hop operation, the input vector directly converted from the inquiry can be the input vector for the first hop operation. In an event that the individual hop operation is not a first hop operation, the input vector for the individual hop operation can be a combination of an input vector and an output vector for another hop operation that is immediately prior to the individual hop operation.

Then the hop operation generates a probability vector based on the input vector and the first set of memory vectors. In some embodiments, the hop operation feeds a combination of the input vector and each memory vector of the first set of memory vectors into a continuous weighting function to produce an element of the probability vector. In some embodiments, the combination can be, e.g., a dot product of the input vector and the memory vector, or a cosine function.

The continuous weighting function can be, e.g., a softmax function. Such a continuous weighting function allows backpropagation of training error signal through the continuous weighting function to the inquiry and the knowledge entries during training of the feature extraction component and the prediction component.

Then the hop operation generates the probability vector including the elements produced by the continuous weighting function corresponding to the memory vectors of the first set. Each element of the probability vector can indicate a level of relevancy between the inquiry and a knowledge entry corresponding to the element.

The hop operation generates an output vector as a weighted combination of the second set of memory vectors, where the weights of the weighted combination are the elements of the probability vector. In some embodiments, for example, the weighted combination can be a weighted sum, using the elements of the probability vector as the weights.

The model 1400 further includes a prediction component 1470. The prediction component 1470 takes the output of the last hop operation and determines a machine-generated response 1480 responding to the inquiry. In some embodiments, the prediction component 1470 combines the output vector and the input vector of the last hop operation, feeds the combination into a prediction matrix, and calculates a continuous weighting function of a result of the prediction matrix to produce the machine-generated response 1480 to the inquiry. The prediction matrix can be part of the matrices 1450 to be trained by the training component 1420.

The first and second memory embedding matrices for different hop operation can have certain relationships between them (also referred to as weight tying). For example, the model 1400 can adopt, e.g., a layer-wise weight tying scheme or an adjacent weight tying scheme.

Under layer-wise weight tying scheme, the first memory embedding matrix for the hop operations share the same parameters. Similarly, the second memory embedding matrix for the hop operations share the same parameters. The layer-wise weight tying scheme can further use a linear mapping matrix to update the input vector. For example, in an event that the individual hop operation is not a first hop operation, the input vector for the individual hop operation can be a sum of an output vector of another hop operation and an input vector for the other hop operation that is updated by a linear mapping matrix. The other hop operation is immediately prior to the individual hop operation.

Under the adjacent weight tying scheme, the instances of the first memory embedding matrix for each of the hop operations have different parameters. Similarly, the instances of the second memory embedding matrix for each of the hop operations have different parameters. Particularly, the instance of the first memory embedding matrix for the individual hop operation can share the same parameters as an instance of the second memory embedding matrix for another hop operation that is immediately prior to the individual hop operation.

Furthermore, the adjacent weight tying scheme can apply further restraints. For example, for a first hop operation, the instance of the first memory embedding matrix can share the same parameters with the inquiry embedding matrix. For the last hop operation, the instance of the second memory embedding matrix can share the same parameters with a prediction matrix used by the prediction component to determine the machine-generate response.

MemN2N Application for Question Answering

The end-to-end memory network (MemN2N) can be applied to solve various types of problems, where a solution of a problem depends on a set of inputs. For example, the type of the problem can be, e.g., question answering.

Figure 15:
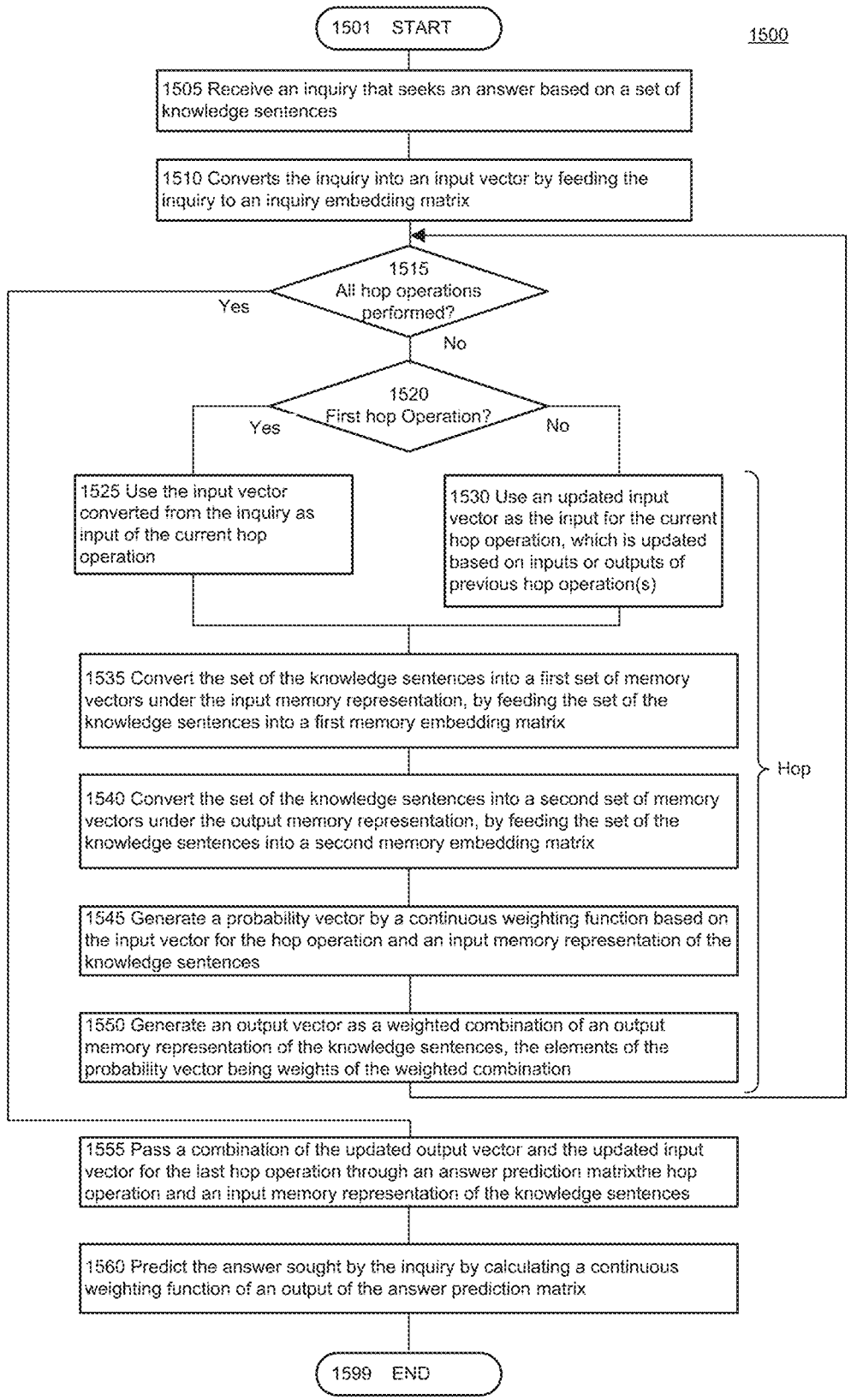
FIG. 15 is a block diagram illustrating a process of predicting an answer to a question by an end-to-end memory network.

FIG. 15 is a block diagram illustrating a process of predicting an answer to a question by an end-to-end memory network. The process 1500 starts at block 1505, where the model receives an inquiry that seeks an answer based on a set of knowledge sentences. The model can also receive the set of knowledge sentences as part of the input. At block 1510, the model converts the inquiry into an input vector by feeding the inquiry to an inquiry embedding matrix.

At decision block 1515, the model determines whether all planned hop operations have been performed. If so, the process 1500 proceeds to block 1555 for generating the final output. If not, the process 1500 proceeds to block 1520 to perform a hop operation (also referred to as a layer of the end-to-end memory network).

At block 1520, the model determines whether the current hop operation is the first hop operation. If the current hop operation is the first hop operation, at block 1525, the model uses the input vector converted from the inquiry as input of the current hop operation. Otherwise, at block 1530, the model uses an updated input vector as the input for the current hop operation, which is based on previous inputs and/or outputs of previous hop operation(s). For example, the updated input vector can be a combination of a prior input vector and a prior output vector for another hop operation prior to the current hop operation.

At Block 1535, the model converts the set of the knowledge sentences into a first set of memory vectors under the input memory representation, by feeding the set of the knowledge sentences into a first memory embedding matrix (also referred to as input memory embedding matrix). At block 1540, the model further converts the set of the knowledge sentences into a second set of memory vectors under the output memory representation, by feeding the set of the knowledge sentences into a second memory embedding matrix (also referred to as output memory embedding matrix).

The model can adopt various types of weight tying scheme for the matrices. If the model adopts an adjacent weight tying scheme, the parameters of the first memory embedding matrix are different for each hop operation; similarly, the parameters of the second memory embedding matrix are different for each hop operation. Particularly, the first memory embedding matrix for the current hop operation is the same matrix as the second memory embedding matrix for another hop operation conducted immediately prior to the current hop operation.

If the model adopts layer-wise weight tying scheme, the parameters of the first memory embedding matrix are the same for all hop operations; similarly, the parameters of the second memory embedding matrix are the same for all hop operations. The same matrix parameters can lead to the same set of resulting memory vectors. Therefore, in case of the layer-wise weight tying scheme, the steps at blocks 1535 and 1540 can be performed before any hop operations are initiated. During the hop operations, those steps need not to be repeated.

In some embodiments, the input and/or output memory representation of the knowledge sentences can include encoded information that relates to positions of words within the knowledge sentences. Thus, the model can predict an answer that relates to word orders within the knowledge sentences in a more efficient and more accurate way.

At block 1545, the model generates a probability vector by a continuous weighting function based on the input vector for the hop operation and an input memory representation of the knowledge sentences. Each element of the probability vector can indicate a level of relevancy between the inquiry and a corresponding knowledge sentence In some embodiments, the continuous weighting function can be, e.g., a softmax function of a dot product of the input vector and a memory vector of the first set corresponding to a knowledge sentence. The continuous weighting function such as the softmax function allows back-propagation of training error signal through the function to the inquiry during training of the matrices of the model.

At block 1550, the model generates an output vector as a weighted combination of an output memory representation of the knowledge sentences, the elements of the probability vector being weights of the weighted combination. The output vector is the output of the current hop operation.

When the model finishes all hop operations, the process 1500 proceeds to block 1555, where the model passes a combination of the updated output vector and the updated input vector for the last hop operation through an answer prediction matrix. In some embodiments, the combination is a vector sum of the updated output vector and the updated input vector for the last hop operation. At block 1560, the model predicts the answer sought by the inquiry by calculating a continuous weighting function of an output of the answer prediction matrix. In some embodiments, the continuous weighting function can be, e.g., a softmax function.

FIG. 16 is an illustration of example tasks of question answering performed by the end-to-end memory network. In each task illustrated in FIG. 16, the task includes a set of statements as the input set, followed by a question whose answer is a single word (or a set of words). At training time, the answers are provided to the model. At test time (or production time), the model predicts the answers. Those illustrated tasks represent different forms of reasoning and deduction.

For each question, a subset of the statements actually contains information needed for the answers (also referred to as supporting subset), and the other statements are irrelevant distractors (e.g., the first sentence in the first example of FIG. 16). For a memory network illustrated in FIGS. 1-4, this supporting subset was explicitly indicated to the memory network model through supervision during training. In contrast, no such indication of supporting subset is provided to the end-to-end memory network illustrated in FIGS. 12-14 during training. Therefore, the end-to-end memory network decides by itself, at the training and production stages, which inputs (e.g., sentences) are relevant and which inputs are irrelevant.

FIG. 17 shows a table listing test error rates of end-to-end memory networks using various numbers of layers and various sentence representations. Each column of the table represents an end-to-end memory network with a particular number of layer(s) and a particular sentence representation. Some of the end-to-end memory networks use linear start (LS) training process as discussed in previous paragraphs. The end-to-end memory network can achieve a prediction accuracy that is comparable to the memory network that requires supervision on picking the supporting subset. However, the end-to-end memory network is easier to be trained because only end-to-end supervision (e.g., training supervision on inputs and outputs) is needed.

As shown in the table of FIG. 17, the position encoding (PE) representation can improve over bag-of-words (BoW) representation, as demonstrated by improvements on tasks 4, 5, 15 and 18, where word ordering is related to the answer. The linear start (LS) training helps avoiding local minima. For example, in the task 16 of the table, PE alone has an error rate of 53.6%; while the LS training process reduces the error rate to 1.6%. Jittering the time index with random empty memories (RN) can boost the performance, especially for a smaller training set (e.g., a set of 1k training samples). Joint training on all tasks can also help reducing the error rate. Multiple computational hops generally improve the performance of the end-to-end memory network (referred to as "MemN2N" in the table) over a network with a single hop.

FIG. 18 shows a table of sample probabilities p of each hop of end-to-end memory networks. During the training, the end-to-end memory network does not need labeling (supervision) of the supporting facts. The probabilities p of each hop is listed by the model during inference for various sample stories. The values of probabilities p prove that the end-to-end memory network successfully learns to focus on the relevant sentences.

MemN2N Application for Language Modeling

The end-to-end memory network (MemN2N) can be applied to language modeling as well. The goal in language modeling is to predict the next word in a text sequence given the previous words x. The end-to-end memory network can operate at word level, as opposed to the sentence level. Thus, the given N words in the text sequence are embedded into memory separately. Each memory cell can hold a single word. Therefore, there is no need for bag-of-words or linear mapping representations as illustrated in question answering tasks. The model can employ the temporal embedding representation.

Since there is no longer any question (an alternative interpretation is that the question is always what is the next word), inquiry vector q can be fixed to a constant vector. The output softmax function predicts which word in the vocabulary (of size V) is next in the text sequence. In some embodiments, a cross-entropy loss can be used as the objective function to train the model by back-propagating the training error through multiple memory layers, in the same manner as the model in the question answering tasks.

The model can use, e.g., layer-wise weight tying scheme. The weight tying restricts the number of parameters in the model, and helps generalization for the deeper models that can be effective for the language modeling tasks.

Figure 19:
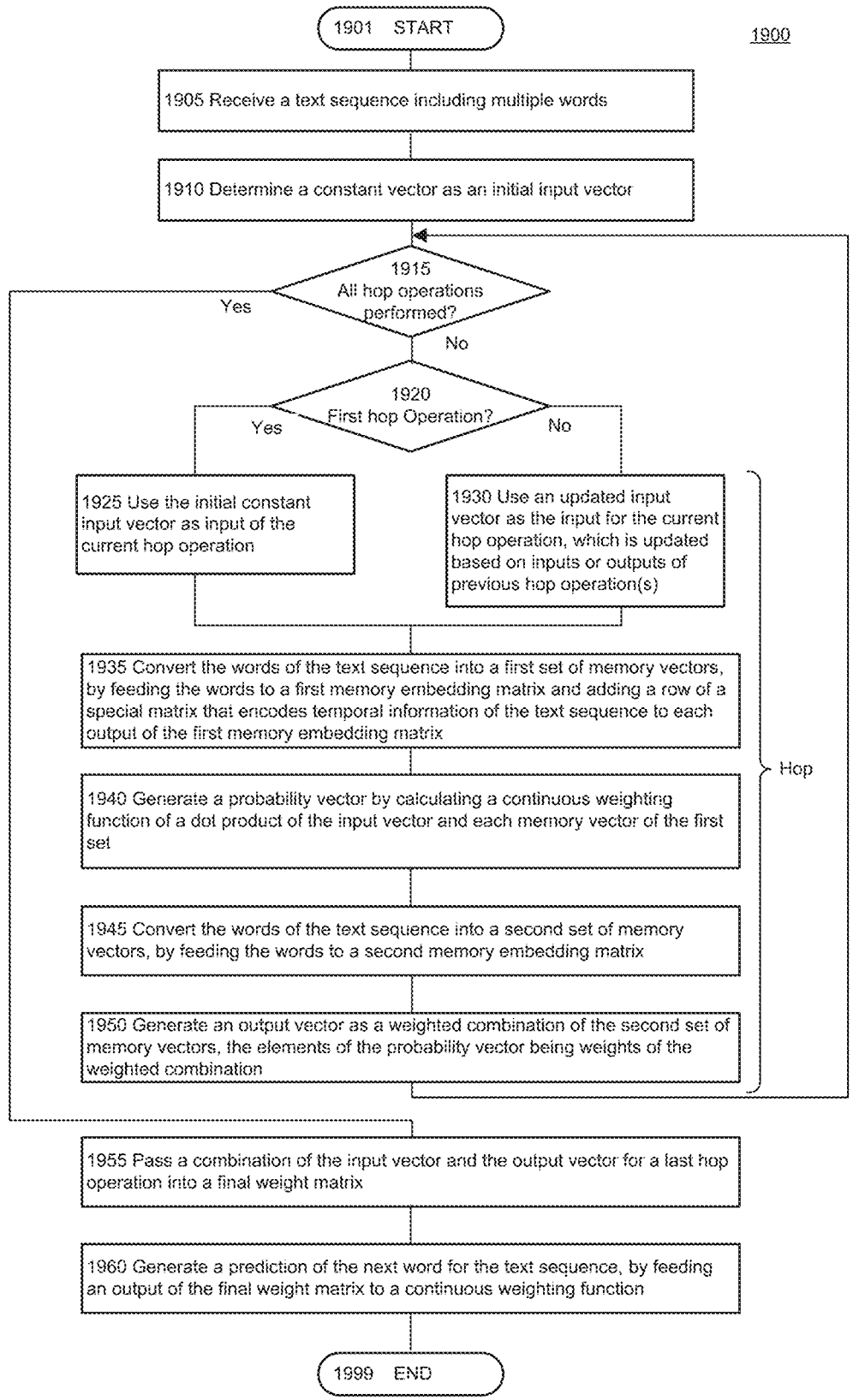
FIG. 19 is a block diagram illustrating a process of language modeling by an end-to-end memory network.

FIG. 19 is a block diagram illustrating a process of language modeling by an end-to-end memory network. The process 1900 starts at block 1905, where the model receives a text sequence including multiple words. In some embodiments, the model may not receive an inquiry, because the inquiry for a language modeling task is typically what is the next word for the text sequence. Thus, at block 1910, the model determines a constant vector as an initial input vector.

At decision block 1915, the model determines whether all planned hop operations have been performed. If so, the process 1900 proceeds to block 1955 for generating the final output. If not, the process 1900 proceeds to block 1920 to perform a hop operation (also referred to as a layer of the end-to-end memory network).

At decision block 1920, the model determines whether the current hop operation is the first hop operation. If the current hop operation is the first hop operation, at block 1925, the model uses the initial constant input vector as input of the current hop operation. Otherwise, at block 1930, the model uses an updated input vector as the input for the current hop operation, which is updated based on inputs and/or outputs of previous hop operation(s). In some embodiments, the updated input vector can be a combination of a prior input vector and a prior output vector for another hop operation prior to the current hop operation.

At block 1935, the model converts the words of the text sequence into a first set of memory vectors, by feeding the words to a first memory embedding matrix and adding a row of a special matrix that encodes temporal information of the text sequence to each output of the first memory embedding matrix. In some other embodiments, the model can feed the words to the first memory embedding matrix without adding the special matrix that encodes temporal information.

At block 1940, the model generates a probability vector by calculating a continuous weighting function of a dot product of the input vector and each memory vector of the first set. In some embodiments, each element of the probability vector can indicate a level of relevancy between the next word to be predicted and a corresponding word from the text sequence.

At block 1945, the model further converts the words of the text sequence into a second set of memory vectors, by feeding the words to a second memory embedding matrix. At block 1950, the model generates an output vector as a weighted combination of the second set of memory vectors, the elements of the probability vector being weights of the weighted combination.

Once the model finishes all hop operations, the process 1900 proceeds to block 1955, wherein the model passes a combination of the input vector and the output vector for a last hop operation into a final weight matrix. At block 1960, the model generates a prediction of the next word for the text sequence, by feeding an output of the final weight matrix to a continuous weighting function. In some embodiments, the continuous weighting function can be, e.g., a softmax function.

FIG. 20 shows a table listing language modeling results of end-to-end memory networks trained by two different publically available training sets. The training sets are Penn Treebank and Text8. As shown in the table, the end-to-end memory networks (MemN2N) can have various numbers of hops and various memory sizes. Both the number of hops and the memory size can help the performance of the model.

Figure 21:
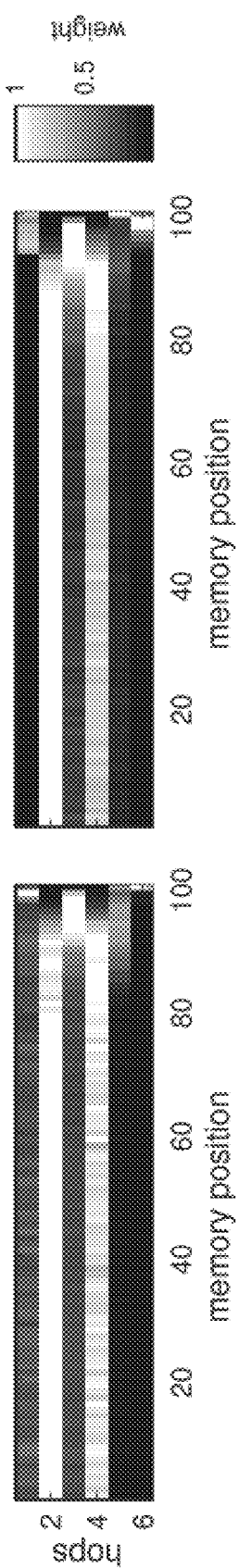
FIG. 21 illustrates average activation weight of memory positions during multiple memory hops of end-to-end memory networks.

FIG. 21 illustrates average activation weight of memory positions during multiple memory hops of end-to-end memory networks. White color indicates where the model is attending during the kth hop. For clarity, each row of the figure is normalized to have a maximum value of 1. The grey level represents the activation weight, which corresponds to a level of attention over that particular memory position. The model on the left is trained on Penn Treebank training set; the model on the right is trained on Text8 training set. Each model has 6 memory hops.

As shown in FIG. 21, some hops concentrate only on recent words; while other hops have more broad attention over a broad range of memory positions. This is consistent with the idea that successful language models include a smoothed n-gram model and a cache. The cache does not decay exponentially and has roughly the same average activation across the entire memory, which suggests improvement in language modelling.

Sample Hardware Architecture

Figure 22:
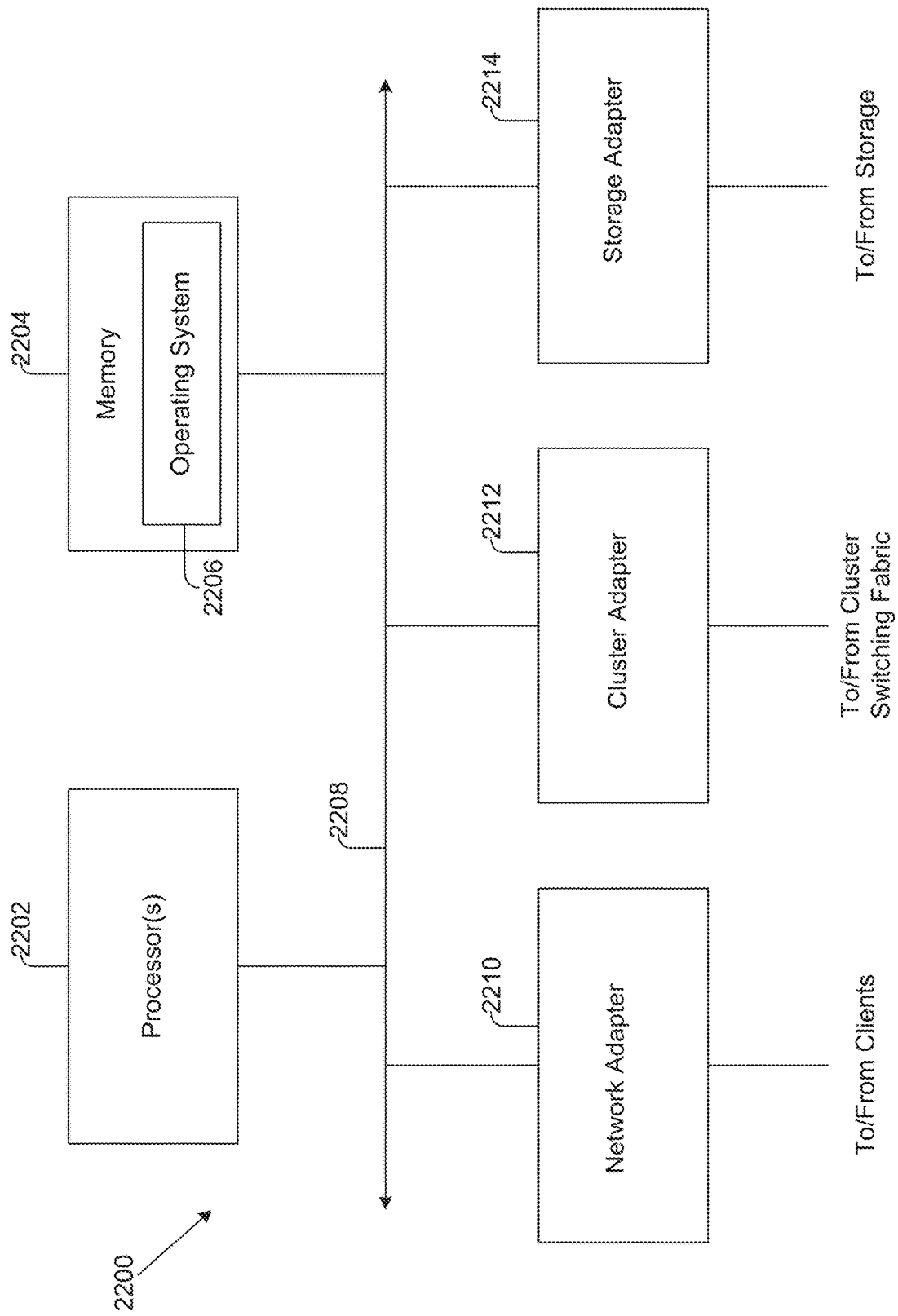
FIG. 22 is a high-level block diagram illustrating an example of a hardware architecture of a computing device that performs disclosed processes, in various embodiments.

FIG. 22 is a high-level block diagram illustrating an example of a hardware architecture of a computing device 2200 that performs the above processes, consistent with various embodiments. The computing device 2200 executes some or all of the processor executable process steps that are described below in detail. In various embodiments, the computing device 2200 includes a processor subsystem that includes one or more processors 2202. Processor 2202 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 2200 can further include a memory 2204, a network adapter 2210, a cluster access adapter 2212 and a storage adapter 2214, all interconnected by an interconnect 2208. Interconnect 2208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 2212 includes one or more ports adapted to couple the computing device 2200 to other devices. In the illustrated embodiment, Ethernet can be used as the clustering protocol and interconnect media, although other types of protocols and interconnects may be utilized within the cluster architecture described herein.

The computing device 2200 can be embodied as a single- or multi-processor system executing an operating system 2206 that can implement a high-level module, e.g., a manager, to logically organize the information as a hierarchical structure of named directories, files and special types of files called virtual disks at the storage devices. The computing device 2200 can further include graphical processing unit(s) for graphical processing tasks or processing non-graphical tasks in parallel.

The memory 2204 can comprise storage locations that are addressable by the processor(s) 2202 and adapters 2210, 2212, and 2214 for storing processor executable code and data structures. The processor 2202 and adapters 2210, 2212, and 2214 may, in turn, comprise processing elements and/or logic circuitry configured to execute the software code and manipulate the data structures. The operating system 2206, portions of which are typically resident in memory and executed by the processor(s) 2202, functionally organizes the computing device 2200 by (among other things) configuring the processor(s) 2202 to invoke. It will be apparent to those skilled in the art that other processing and memory implementations, including various computer readable storage media, may be used for storing and executing program instructions pertaining to the technology.

The network adapter 2210 can include multiple ports to couple the computing device 2200 to one or more clients over point-to-point links, wide area networks, virtual private networks implemented over a public network (e.g., the Internet) or a shared local area network. The network adapter 2210 thus can include the mechanical, electrical and signaling circuitry needed to connect the computing device 2200 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 2214 can cooperate with the operating system 2206 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 2214 can include multiple ports having input/output (I/O) interface circuitry that couples to the disks over an I/O interconnect arrangement, e.g., a conventional high-performance, Fibre Channel (FC) link topology. In various embodiments, the cluster adapter 2212 and the storage adapter 2214 can be implemented as one adapter configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computing device, comprising:
   a feature extraction component including:
      a first memory embedding matrix to convert a set of knowledge entries into a first set of memory vectors,
      a second memory embedding matrix to convert the set of knowledge entries into a second set of memory vectors, and
      an inquiry embedding matrix to convert an inquiry into an input vector;
   a memory hop component to conduct one or more hop operations, each individual hop operation includes:
      determining an input vector for the individual hop operation,
      generating a probability vector based on the input vector and the first set of memory vectors, and
      generating an output vector as a weighted combination of the second set of memory vectors, weights of the weighted combination being elements of the probability vector; and
   a prediction component to determine a machine-generated response to the inquiry based on the output vector of a last hop operation among the one or more hop operations.

2. The computing device of claim 1, wherein the set of knowledge entries are a set of sentences, the inquiry is a question seeking an answer based on the sentences, and the machine-generated response is a machine-predicted answer to the question.

3. The computing device of claim 1, wherein the set of knowledge entries are words within a text sequence, the inquiry is to seek a prediction of a next word for the text sequence, and the machine-generated response is a machine-prediction of the next word.

4. The computing device of claim 1, further comprising:
   a training component to train matrices of the feature extraction component and the prediction component using a training data set including sample knowledge entries, sample inquiry and sample responses.

5. The computing device of claim 4, wherein the training component needs no supervision on picking knowledge entries or memory vectors that are relevant to the inquiry, during the training of the matrices of the feature extraction component and the prediction component.

6. The computing device of claim 1, wherein the prediction component determines the machine-generated response to the inquiry, by steps of:
   combining the output vector and the input vector of the last hop operation;
   feeding the combination of the output vector and the input vector into a prediction matrix; and
   calculating a continuous weighting function of a result of the prediction matrix to produce the machine-generated response to the inquiry.

7. The computing device of claim 1, wherein the individual hop operation generates the probability vector by:
   feeding a dot product of the input vector and each memory vector of the first set of memory vectors into a continuous weighting function to produce an element of the probability vector; and
   determining the probability vector including the elements produced by the continuous weighting function corresponding to the memory vectors of the first set.

8. The computing device of claim 7, wherein each element of the probability vector indicates a level of relevancy between the inquiry and a knowledge entry corresponding to the element.

9. The computing device of claim 7, wherein the continuous weighting function is a softmax function, the softmax function allows back-propagation of training error signal through the softmax function to the inquiry and the knowledge entries during training of the feature extraction component and the prediction component.

10. The computing device of claim 1, wherein the memory hop component determines the input vector for the individual hop operation by:
    in an event that the individual hop operation is a first hop operation, determining that the input vector converted from the inquiry is the input vector for the first hop operation; and
    in an event that the individual hop operation is not a first hop operation, determining the input vector for the individual hop operation as a combination of an input vector and an output vector for another hop operation that is immediately prior to the individual hop operation.

11. The computing device of claim 1, wherein the first memory embedding matrix for the one or more hop operations share the same parameters, and the second memory embedding matrix for the one or more hop operations share the same parameters.

12. The computing device of claim 11, wherein in an event that the individual hop operation is not a first hop operation, determining the input vector for the individual hop operation as a sum of an output vector of another hop operation and an input vector for the other hop operation updated by a linear mapping matrix, the other hop operation being immediately prior to the individual hop operation.

13. The computing device of claim 1, wherein instances of the first memory embedding matrix for each of the hop operations have different parameters, instances of the second memory embedding matrix for each of the hop operations have different parameters; and
    wherein the individual hop operation further includes:
       converting the set of knowledge entries into a first set of memory vectors for the individual hop operation, using the instance of the first memory embedding matrix corresponding to the individual hop operation; and
       converting the set of knowledge entries into a second set of memory vectors for the individual hop operation, using the instance of the second memory embedding matrix corresponding to the individual hop operation.

14. The computing device of claim 13, wherein the instance of the first memory embedding matrix for the individual hop operation share the same parameters as an instance of the second memory embedding matrix for another hop operation that is immediately prior to the individual hop operation.

15. The computing device of claim 14, wherein
for a first hop operation, the instance of the first memory embedding matrix share the same parameters with the inquiry embedding matrix; and
for a last hop operation, the instance of the second memory embedding matrix share the same parameters with a prediction matrix used by the prediction component to determine the machine-generate response.

* * * * *